United States Patent
Liu et al.

(10) Patent No.: US 11,522,438 B2
(45) Date of Patent: Dec. 6, 2022

(54) CONVERSION SYSTEM AND CONTROL METHOD THEREOF

(71) Applicant: Delta Electronics (Shanghai) Co., Ltd., Shanghai (CN)

(72) Inventors: Hong Liu, Shanghai (CN); Yong Tao, Shanghai (CN); Cheng Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/383,455

(22) Filed: Jul. 23, 2021

(65) Prior Publication Data

US 2022/0052621 A1    Feb. 17, 2022

(30) Foreign Application Priority Data

Aug. 14, 2020  (CN) .......................... 202010816482.3
May 27, 2021  (CN) .......................... 202110584137.6

(51) Int. Cl.
*H02M 1/00*  (2006.01)
*H02M 7/483*  (2007.01)
*H02M 7/219*  (2006.01)

(52) U.S. Cl.
CPC ....... *H02M 1/0074* (2021.05); *H02M 1/0003* (2021.05); *H02M 1/0043* (2021.05); *H02M 7/219* (2013.01); *H02M 7/4833* (2021.05); *H02M 7/4835* (2021.05)

(58) Field of Classification Search
CPC ............. H02M 1/0074; H02M 1/0003; H02M 1/0043; H02M 7/219; H02M 7/4833; H02M 7/4835
See application file for complete search history.

(56) References Cited

FOREIGN PATENT DOCUMENTS

| CN | 202455073 U | 9/2012 |
|---|---|---|
| CN | 103546024 A | 1/2014 |
| CN | 103956915 B | 8/2016 |
| CN | 104038060 B | 8/2016 |

(Continued)

OTHER PUBLICATIONS

Hou et al., "A General Decentralized Control Scheme for Medium-/High-Voltage Cascaded STATCOM", IEEE Transactions on Power Systems, vol. 33, No. 6, Nov. 1, 2018, pp. 7296-7300.

(Continued)

*Primary Examiner* — Jue Zhang
(74) *Attorney, Agent, or Firm* — CKC & Partners Co., LLC

(57) ABSTRACT

The present application provides a conversion system and a control method, including N power converters and N controllers, and N controllers one-to-one corresponds to the N power converters. In addition to receiving a first side current and a second side voltage of a corresponding power converter, each of the N controllers can also receive a neighboring direct current voltage signal which only reflects second side voltages of other M power converters in the conversion system, and perform voltage control on the corresponding power converter according to the received signal. The present application adopts fully distributed control, and does not need to set up a centralized controller. When parts of controllers fail, the other controllers can continue to work, so the reliability is higher.

16 Claims, 13 Drawing Sheets

(56) References Cited

FOREIGN PATENT DOCUMENTS

| CN | 107294387 A | 10/2017 | | |
|---|---|---|---|---|
| WO | WO-2017071977 A1 | * | 5/2017 | ............ H02M 1/088 |

OTHER PUBLICATIONS

Anonymous: "Ring network—Wikipedia", Feb. 18, 2020, Retrieved from the Internet: URL:https://en.wikipedia.org/w/index.php?title=Ring_network&oldid=941421513 (retrieved on Dec. 17, 2021).

Anonymous: "Spanning Tree Protocol—Wikipedia", Jul. 14, 2020, Retrieved from the Internet: URL: https://en.wikipedia.org/w/index.php?title=Spanning_Tree_Protocol&oldid=967679778 (retrieved on Dec. 17, 2021).

Yang et al., "Control Conflict Suppressing and Stability Improving for an MMC Distributed Control System", IEEE Transactions on Power Electronics, vol. 35, No. 12, May 20, 2020, pp. 13735-13747.

Koyama et al., "Current Control of Modular Multilevel Converters Using a Daisy-Chained Distributed Control System with Communication Path Redundancy", IECON 2019—45th Annual Conference of the IEEE Industrial Electronics Society, IEEE, vol. 1, Oct. 14, 2019, pp. 6108-6113.

Tu et al., "A Hybrid Communication Topology for Modular Multilevel Converter", 2018 IEEE Applied Power Electronics Conference and Exposition (APEC), IEEE, Mar. 4, 2018, pp. 3051-3056.

Corresponding European search report dated Jan. 5, 2022.
Corresponding European search report dated Jan. 10, 2022.

\* cited by examiner

CONVERSION SYSTEM AND CONTROL METHOD THEREOF

CROSS-REFERENCE TO RELATED APPLICATION

This application claims priority to Chinese Patent Application No. 202110584137.6, filed on May 27, 2021 and Chinese Patent Application No. 202010816482.3, filed on Aug. 14, 2020, both of which are hereby incorporated by reference in its entirety.

TECHNICAL FIELD

This application relates to the field of power electronics technologies, and in particular, to a conversion system and a control method thereof.

BACKGROUND

A power electronic converter is a device for implementing electric energy conversion by using power electronic components. A cascade converter includes multiple power electronic converters (hereinafter referred to as power converters) of which input sides are connected in series. Due to a high degree of modularity and good scalability of the cascade converter, it is widely used for power devices, for example, Solid State Transformer (Electronic Power Transformer, EPT), Static Var Compensator (Static Var Compensator, SVC), and medium to high voltage and high power inverters.

A cascade conversion system generally adopts centralized control or partly centralized control. In the centralized control, a central controller collects input signals and output signals of respective power converters, performs calculation, and outputs pulse modulation signals to the power converters, to control the operation of the power converters.

The partly centralized control adopts a central controller and multiple local controllers, and one local controller controls one power converter. The central controller collects input signals and output signals of respective power converters, performs calculations and outputs intermediate control values. Each of the local controllers generates a PWM (pulse with modulation) signal according to the intermediate control variable and the output signal of the corresponding power converter.

However, regardless of centralized control or partly centralized control, a central controller is provided for control. If the central controller fails, the cascade converter cannot continue to work and the reliability is low.

SUMMARY

The present application provides a conversion system and a control method thereof, which aims to solve the above-mentioned problem in the prior art.

In a first aspect, the present application provides a conversion system, including:

N power converters, each of the power converters including a first side and a second side, and the first sides of the N power converters being electrically coupled in series, and N controllers, one-to-one corresponding to the N power converters, each of the controllers receiving a first side current and a second side voltage of a corresponding power converter, where each of at least (N−1) controllers receives a neighboring direct current voltage signal which only reflects second side voltages of other M power converters in the conversion system, and generates a control signal for controlling the first side voltage of the corresponding power converter according to the neighboring direct current voltage signal, and the first side current and the second side voltage of the corresponding power converter, wherein N≥3, 1≤M≤(N−2), and M and N are integers.

In a second aspect, the present application provides a control method for controlling a conversion system, where the conversion system includes:

N power converters, each of the power converters including a first side and a second side, the first sides of the N power converters are electrically coupled in series, and N controllers, one-to-one corresponding to the N power converters, and each of the controllers receiving a first side current and a second side voltage of a corresponding power converter;

the control method including:

S1, receiving, by each of at least (N−1) controllers of the N controllers, a neighboring direct current voltage signal which only reflects second side voltages of other M power converters; and S2, generating, by each of at least (N−1) controllers of the N controllers, a control signal for controlling the first side voltage of the corresponding power converter according to the neighboring direct current voltage signal, and the first side current and the second side voltage of the corresponding power converter, where N≥3, 1≤M≤(N−2), and M and N are integers.

The present application provides a conversion system and a control method, including N power converters and N controllers, and N controllers one-to-one corresponds to the N power converters. In addition to receiving a first side current and a second side voltage of a corresponding power converter, each of the N controllers can also receive a neighboring direct current voltage signal which only reflects second side voltages of other M power converters in the conversion system and perform voltage control on the corresponding power converter according to the received signal.

DETAILED DESCRIPTION OF EMBODIMENTS

In order to make the purpose, technical solutions and advantages of this application clearer, the technical solutions in the present application will be clearly and completely described below in conjunction with the drawings in this application. Obviously, the described embodiments are part of the embodiments of the application, rather than all of the embodiments. Based on the embodiments in this application, all other embodiments obtained by those skilled in the art without creative efforts fall within the protection scope of this application.

A power electronic converter is a device for implementing electric energy conversion by using power electronic components. A cascade conversion system includes multiple power electronic converters (hereinafter referred to as power converters) of which the input sides are connected in series. Due to a high degree of modularity and good scalability of the cascade converter, it is widely used for power devices, for example, Solid State Transformer (Electronic Power Transformer, EPT), Static Var Compensator (Static Var Compensator, SVC), and medium to high voltage and high power inverters.

Figure 1:
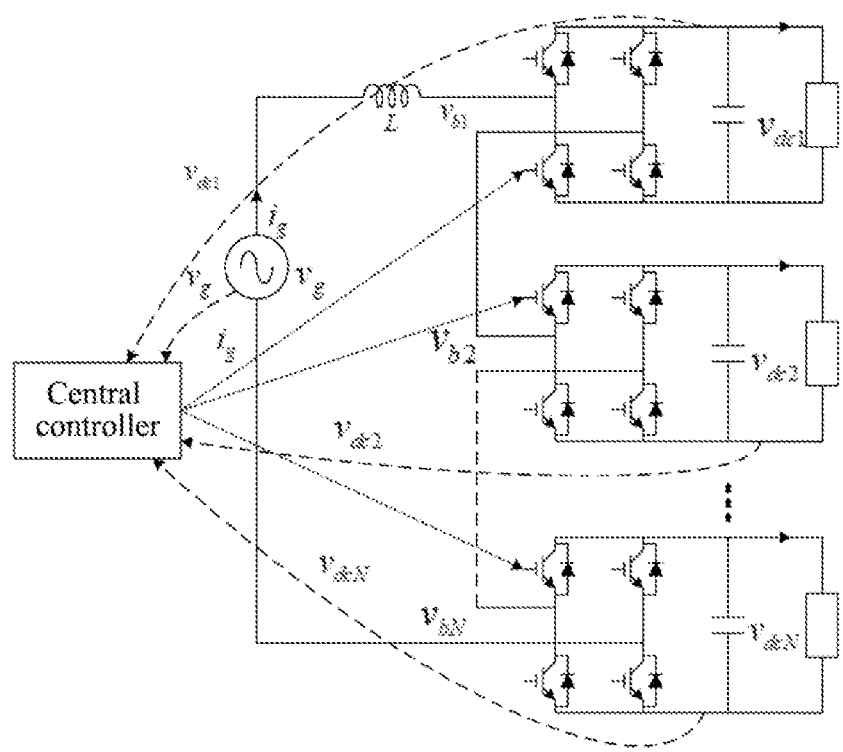
FIG. 1 is a schematic structural diagram of a cascade converter adopting centralized control in the prior art.
Figure 2:
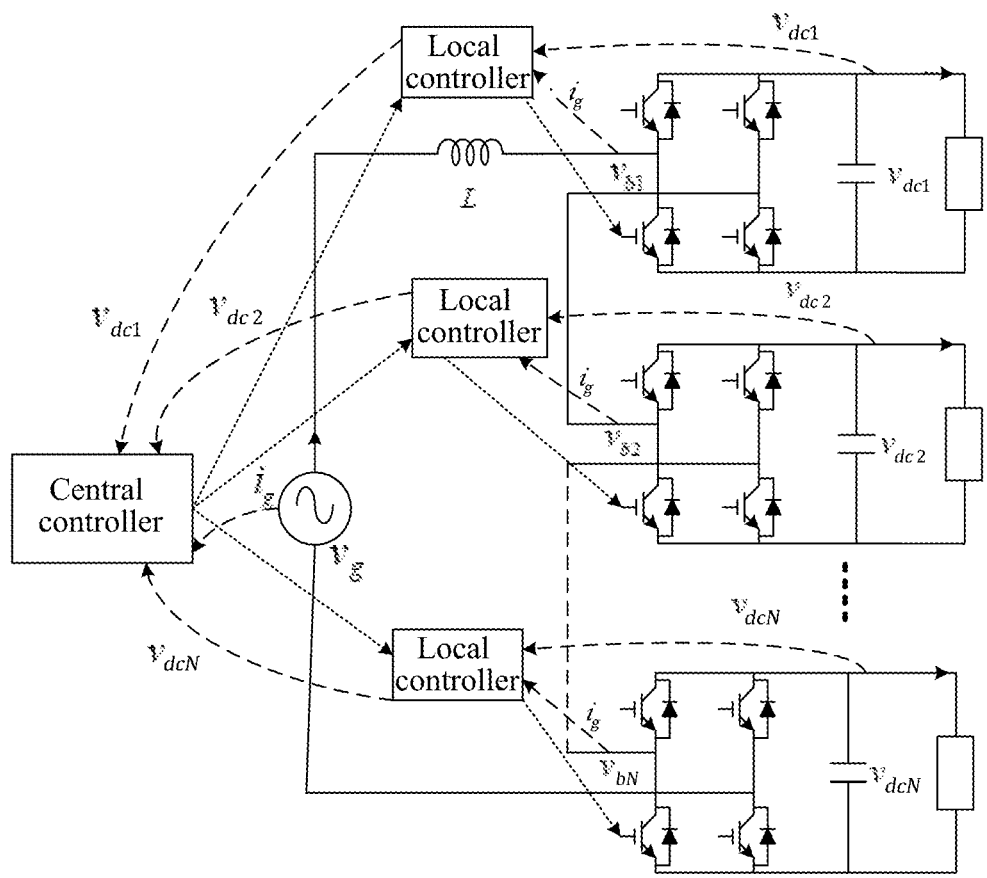
FIG. 2 is a schematic structural diagram of a cascade converter adopting partly centralized control in the prior art.

As shown in FIGS. 1 and 2, in the prior art, a cascade conversion system generally uses centralized control or partly centralized control. In the centralized control, a central controller collects input signals (an input voltage $v_g$ and an input current $i_g$) of the cascade conversion system and output signals ($v_{dc1}$, $v_{dc2}$, . . . , $v_{dcn}$) of respective power converters, performs calculations, outputs pulse modulation signal to the power converters and modulates the input voltages ($v_{b1}$, $v_{b2}$, . . . , $v_{bn}$) of the power converters. The partly centralized control adopts a central controller and multiple local controllers, and one local controller controls one power converter. The central controller collects input signals and output signals of respective power converters, performs calculations and outputs intermediate control values. Each of local controllers generates a PWM signal according to an intermediate control variable and the output signal of the corresponding power converter, where the PWM signal is configured to control the operation of the power converters.

However, regardless of centralized control or partly centralized control, a central controller is provided for control. If the central controller fails, the cascade converter cannot continue to work and the reliability is low.

In order to solve the above-mentioned problem in the prior art, this application proposes a fully distributed conversion system and a control method thereof. There is no need to use a centralized controller in the conversion system, and only a corresponding controller is configured for each of the power converters, and each controller only needs to receive an output direct current voltage of part of other power converters. Therefore, the number of connections between the power converters is reduced, and the reliability of the cascade conversion system can be improved.

Figure 4:
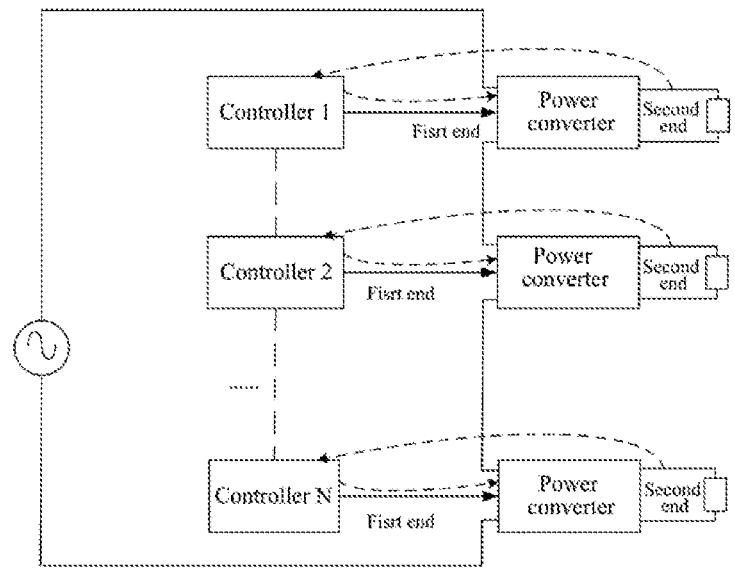
FIG. 4 is a schematic structural diagram of a conversion system provided by a first embodiment of the present application.

FIG. 4 is a schematic structural diagram of a conversion system provided by a first embodiment of the present application. In FIG. 4, the conversion system includes N power converters and N controllers.

Each of the power converters includes a first side and a second side, and the first sides of the N power converters are electrically coupled in series. N≥3, and N is a positive integer.

Figure 3A:
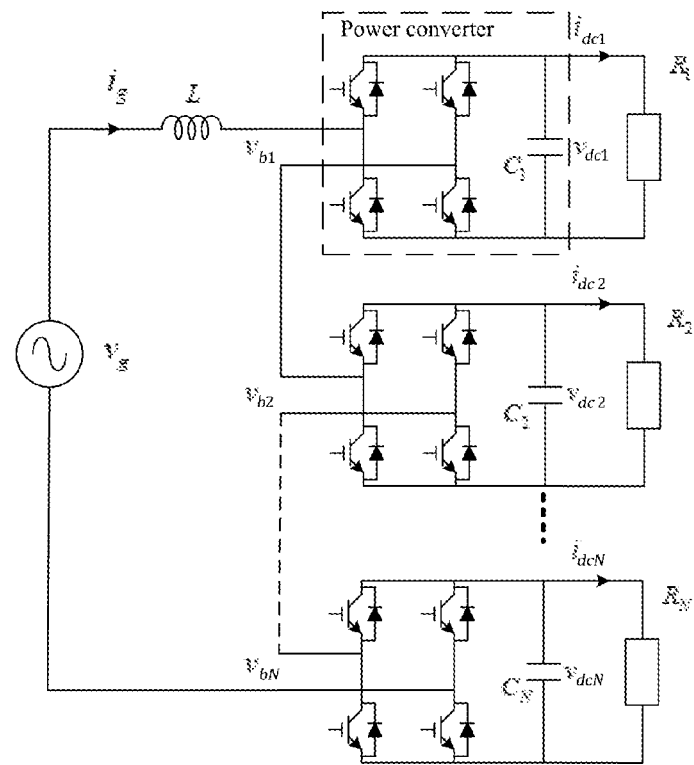
FIG. 3A is a schematic diagram of a main circuit structure of a conversion system provided by the present application.

A main circuit of a cascade conversion system is shown in FIG. 3A. The cascade conversion system includes multiple power converters of which the input sides are connected in series, and the output of each power converter is connected to a load (shown as $R_1$ to $R_N$). Each power converter includes an H bridge and a capacitor. The capacitor is connected in parallel with a direct current side of the H bridge. An alternating current side of the H bridge is used as an alternating current side of the power converter, and a direct current side of the H bridge is used as a direct current side of the power converter. A port formed by midpoints of two bridge arms in the H-bridge is a first side of the power converter, and a port formed by parallel connection of the bridge arms and the capacitor is a second side of the power converter. When the cascade converter with the above structure is configured to connect to an alternating current power source, the first side of the power converter is used as an input side, and the second side of the power converter is used as an output side. When the cascade converter is configured to connect to a direct current power source, the first side of the power converter is used as an output side, and the second side of the power converter is used as an input side.

Figure 3B:
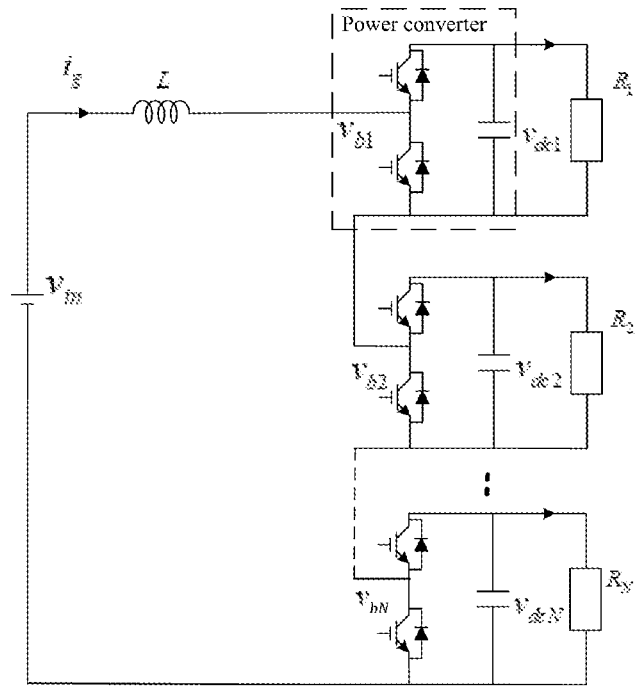
FIG. 3B is a schematic diagram of another main circuit structure of the conversion system provided by the present application.

A main circuit of another cascade conversion system is shown in FIG. 3B. Each power converter includes a single bridge arm and a capacitor, the capacitor is connected in parallel with the bridge arm, the midpoint of the bridge arm and one end of the bridge arm form a first side of the power converter, and two ends of the bridge arm form a second side of the power converter. The cascade conversion system of the above structure can only be used for a direct current power supply. When the first side of the power converter is used as an input side, the second side of the power converter is used as an output side. When the second side of the power converter is used as an input side, the first side of the power converter is used as an output side.

N controllers one-to-one correspond to the N power converters, and each of the controllers receives a first side current and a second side voltage of a corresponding power converter. Each of at least (N−1) controllers of the N controllers receives a neighboring direct current voltage signal which only reflects the second side voltage of other M power converters in the conversion system, $1 \leq M \leq (N-2)$, and M is a positive integer.

That is, there are two cases: a first case is that each controller can receive the neighboring direct current voltage signal and receive the first side current and the second side voltage of the corresponding power converter. That is, in the first case, each controller can only obtain the second side voltage of part of the remaining (N−1) power converters (that is, the neighboring direct current voltage signal), but cannot obtain the second side voltage of all of the remaining (N−1) power converters.

Correspondingly, the working principle of each controller is: a control signal for controlling a first side voltage of the corresponding power converter is generated according to the neighboring direct current voltage signal, and the first side current and the second side voltage of its corresponding power converter, so as to realize voltage control of each power converter.

A second case is that each of (N−1) controllers receives the neighboring direct current voltage signal, and receives the first side current and the second side voltage of the corresponding power converter. The other one controller only receives the first side current and the second side voltage of its corresponding power converter.

In the second case, each of the (N−1) controllers can only obtain the second side voltage of part of the other (N−1) power converters (that is, the neighboring direct current voltage signal), but cannot obtain the second side voltage of all of the other (N−1) power converters.

Correspondingly, the working principle of each controller of the (N−1) controllers is: a control signal is generated according to the neighboring direct current voltage signal, and the first side current and the second side voltage of its corresponding power converter, and the control signal is used for controlling the first side voltage of the corresponding power converter. The other one controller generates a control signal for controlling the first side voltage of the corresponding power converter according to the first side current and the second side voltage of its corresponding power converter.

In the conversion system provided by the embodiments of the present application, fully distributed control is adopted, a corresponding controller is set for each power converter, and there is no need to set up a centralized controller. When part of controllers fail, the other part of controllers can continue to work, so the reliability is higher. In addition, each controller only receives a voltage signal of an adjacent power converter but does not need to obtain the voltage signals of all other power converters, which can greatly reduce the number of connections between the controllers and the amount of data between the controllers, and further improve the reliability of the conversion system.

The following continues to describe the conversion system provided in a second embodiment of the present application, and the second embodiment describes a conversion system structure that meets the first case described above.

In the second embodiment, an information transmission structure among N controllers is a balanced diagram, for example a unidirectional ring network or a bidirectional ring network. That is, communications among the controllers adopt a leaderless mode. Each controller acts as a node in the balanced diagram and the first to N-th controllers correspond to nodes 1 to N respectively. For each node, the number of pieces of information flowing into the node is equal to the number of pieces of information flowing out of the node.

Figure 5:
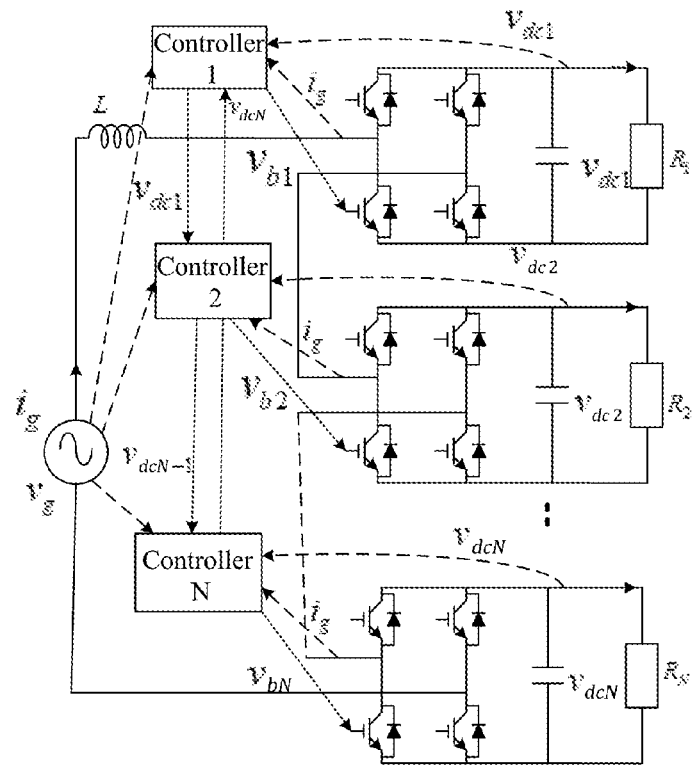
FIG. 5 is a schematic structural diagram of a conversion system with an information transmission structure in a form of a unidirectional ring network provided by a second embodiment of the present application.

The information transmission structure among the N controllers in FIG. 5 is a unidirectional ring network, and the N controllers are connected in sequence to form a ring. The signals between the controllers flow in one direction. Node 1 receives the second side voltage of the N-th power converter sent by node N, and also sends the second side voltage of the first power converter to node 2. The neighboring direct current voltage signal received by node 1 only includes the voltage signal of the N-th power converter, and the sent signal only includes the voltage signal of the first power converter. Therefore, the number of pieces of information flowing into node 1 and the number of pieces of information flowing out of node 1 are both 1, so node 1 is a balanced node, and similarly, each node in the unidirectional ring network is a balanced node.

Figure 6:
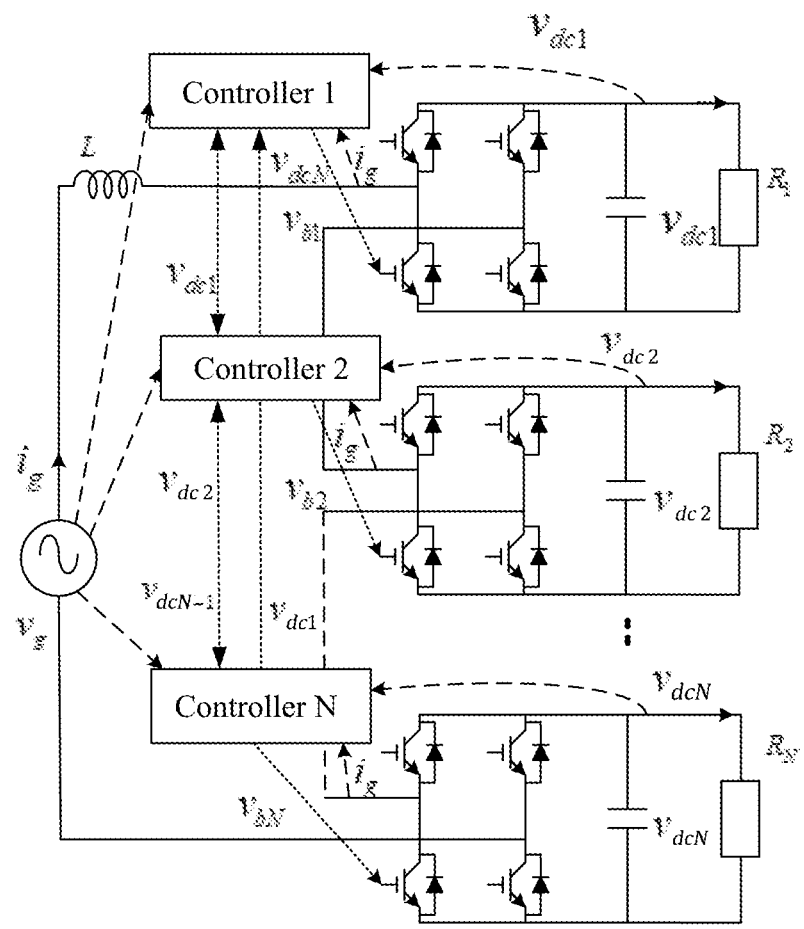
FIG. 6 is a schematic structural diagram of a conversion system with an information transmission structure in a form of a bidirectional ring network provided by the second embodiment of the present application.

The information transmission structure among the N controllers in FIG. 6 is a bidirectional ring network, and the N controllers are connected in sequence to form a ring. The signals between the controllers flow in two directions. Node 1 receives the second side voltage of the N-th power converter sent by node N and the second side voltage of the second power converter sent by node 2, and sends the second side voltage of the first power converter to node 2 and node N. The number of pieces of information flowing into node 1 and the number of pieces of information flowing out of node 1 are both 2, so node 1 is a balanced node, and similarly, each node in the bidirectional ring network is a balanced node.

It should be noted that the information transmission structure herein is not necessarily consistent with the hardware communication wiring diagram. The following takes the hardware wiring structure being a unidirectional ring network as an example for describing. Node N sends its own information to node 1, and meanwhile, node N forwards to node 1 the information that is received from node (N−1), then the number of pieces of information received by node 1 is 2. At this time, node 1 must also send its own information to two different nodes to form a balanced diagram, for example, one is sent to node 2, and the other is forwarded to node 3 through node 2. That is, when the hardware wiring structure is a unidirectional ring network, a current node may receive the second side voltages of the power converters corresponding to all other nodes, or may only receive the second side voltage of the power converter corresponding to an adjacent node, which is not limited by the hardware wiring structure of the controllers.

When the information transmission structure among the N controllers is a balanced diagram, each controller can receive a neighboring direct current voltage signal, and receive the first side current and the second side voltage of its corresponding power converter. Each controller generates a control signal for controlling the first side voltage of the corresponding power converter according to the neighboring direct current voltage signal, and the first side current and the second side voltage of its corresponding power converter.

The working principle of the embodiment of the present application is explained below. The information transmission structure among the N controllers is a balanced diagram, and each controller can receive a neighboring direct current voltage signal, and receive the first side current and the second side voltage of its corresponding power converter. Then, according to the received information, a control signal is generated to control the first side voltage of each power converter, realizing normal operation of the conversion system under fully distributed control.

In the conversion system provided by the embodiments of the present application, the information transmission structure between the N controllers is a balanced diagram, each controller can receive a neighboring direct current voltage signal that reflects the voltage of other controller, and thus enough voltage information of the controllers can be received and meanwhile, the connection relationship among the controllers can be simplified.

The following continues to describe the conversion system provided in a third embodiment of the present application, and the third embodiment describes a conversion system structure that meets the second case described above.

A difference from the second embodiment is that the information transmission structure among N controllers is a spanning tree. That is, the communications among the controllers adopt a leader-follower mode. Each controller acts as a node in the spanning tree and the first to N-th controllers correspond to node 1 to node N, respectively. In the spanning tree, from a root node, all other nodes can be communicated. The root node of the spanning tree is set as a leader node, and the other nodes are set as follower nodes.

When the information transmission structure among N controllers is a spanning tree, the information transmission structure among the N controllers may be of a chain type or a broadcast type.

Figure 7:
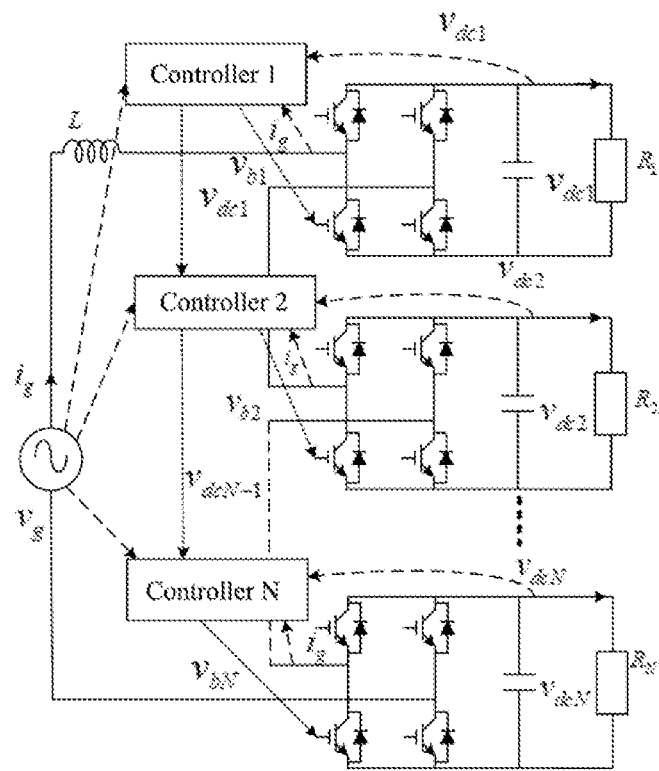
FIG. 7 is a schematic structural diagram of a conversion system with an information transmission structure in a form of a chain-type spanning tree provided by a third embodiment of the present application.

The information transmission structure among N controllers in FIG. 7 meets a chain spanning tree. The N controllers are connected in sequence without forming a ring. The signals between the controllers flow in one direction, that is, the signals flow from the root node to downstream nodes. The first node which no signal flows into is the root node. Since no signal flows in, the controller corresponding to the root node only receives the first side current and the second side voltage of its corresponding power converter. The controllers corresponding to the other nodes can receive a neighboring direct current voltage signal, and receive the first side currents and the second side voltages of the corresponding power converters. The neighboring direct current voltage signal can only reflect the second side voltage of a power converter corresponding to a controller at an upstream node.

Figure 8:
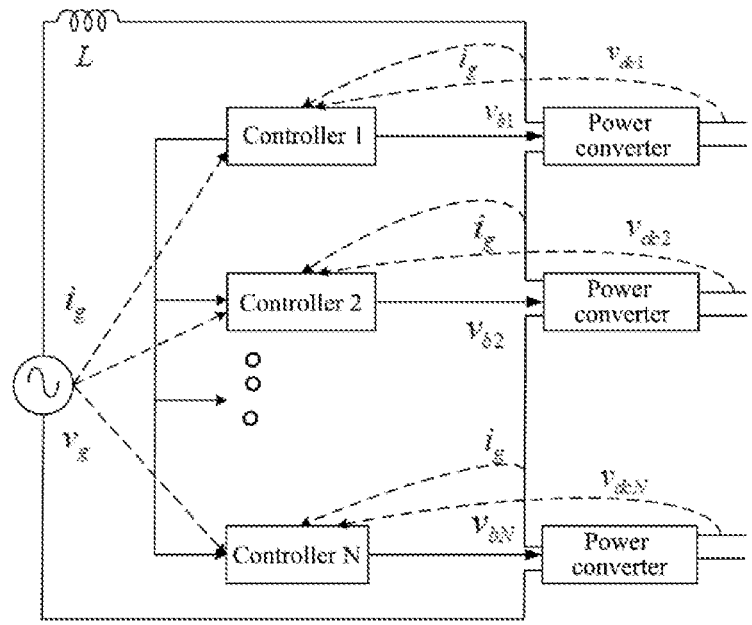
FIG. 8 is a schematic structural diagram of a conversion system with an information transmission structure in a form of a broadcast-type spanning tree provided by the third embodiment of the present application.

The information transmission structure among N controllers in FIG. 8 is a broadcast spanning tree. The controller corresponding to the root node is connected to the other (N−1) controllers, the signals flow among the controller corresponding to the root node and other controllers in one direction, and the controller corresponding to the root node only receives the first side current and the second side voltage of its corresponding power converter. The controllers corresponding to the other nodes can receive the neighboring direct current voltage signal, and the first side currents and the second side voltages of the corresponding power converters. The neighboring direct current voltage signal can only reflect the second side voltage of the power converter corresponding to the root node.

Correspondingly, the controller corresponding to the root node generates a control signal for controlling the first side voltage of the corresponding power converter according to the first side current and the second side voltage of the corresponding power converter. The other nodes generate a control signal for controlling the voltage at the first side of the corresponding power converter according to the neighboring direct current voltage signal, and the first side current and the second side voltage of the corresponding power converter.

In the embodiment of the present application, the information transmission structure among N controllers is a spanning tree. Controllers other than the root node can receive the neighboring direct current voltage signal, and receive the first side current and the second side voltage of the corresponding power converter. Then, a control signal is generated according to the received information to control the first side voltage of each power converter. The root node generates control information according to the first side current and the second side voltage of the corresponding power converter to control the first side voltage of the power converter corresponding to the root node. Thus, normal operation of the conversion system is realized under fully distributed control.

In the conversion system provided by the embodiment of the present application, the information transmission structure among N controllers is a spanning tree, and each node receives the neighboring direct current voltage signal sent by an upstream node, which can reduce the amount of data transmission among the controllers and simplify the connection relationship between the controllers.

The following continues to describe the conversion system 200 provided in a fourth embodiment of the present application. The system includes N power converters 201 and N controllers 202.

Each power converter includes a first side and a second side. The first sides of the N power converters are electrically coupled in series, where N and N is a positive integer.

N controllers one-to-one correspond to the N power converters, and each of the controllers receives a first side current and a second side voltage of its corresponding power converter. Each of at least (N−1) controllers of the N controllers receives a neighboring direct current voltage signal which only reflects second side voltages of other M power converters in the conversion system, where 1≤M≤ (N−2) and M is a positive integer.

The stability problem and voltage balance problem of the conversion system are analyzed respectively below.

Continuing to refer to FIG. 3A, each H-bridge is a power converter. In FIG. 3A, the first side of the power converter is used as the input side, and the second side of the power converter is used as the output side. $i_g$ is a grid current, that is, the first side current of the power converter, $v_g$ is a grid voltage, L is a filter inductance, $C_i$ is a dc-link capacitance of the i-th power converter, $v_{dci}$ is a dc-link voltage of the i-th power converter, that is, the second side voltage of the i-th power converter, $v_{bi}$ is a bridge arm voltage of the i-th power converter, that is, the first side voltage of the i-th power converter, $i_{dci}$ is a direct current output current of the i-th power converter, that is, the second side current of the i-th power converter, and $P_i$ is a direct current side output power of the i-th power converter, that is, the second side power of the i-th power converter.

When the output power of each power converter is the same, the capacitor voltage is the same, and the bridge arm voltage is the same, the input of each power converter will equally share the grid voltage.

According to the circuit, the following unit power balance equation (1) can be known:

$$\frac{dE_i}{dt} = v_{bi}i_g - P_i \tag{1}$$

where $E_i$ is the energy of the dc-link capacitor of the i-th power converter, $$E_i = \frac{1}{2}C_i v_{dci}^2,$$

and i=1, 2, ..., N.

The formula (1) can be decomposed as follows for common mode and differential mode, and the above N equations are summed, and then divided by N to obtain the common mode power balance equation $$\frac{dE_{com}}{dt} = v_{bcom}i_g - P_{com} \tag{2}$$

where $$E_{com} = \frac{1}{N}\sum_{i=1}^{N}\frac{1}{2}C_i v_{dci}^2$$

is average dc-link energy, $$v_{bcom} = \frac{1}{N}\sum_{i=1}^{N}v_{bi}$$

is a common mode component of the bridge arm voltage, and $$P_{com} = \frac{1}{N}\sum_{i=1}^{N}P_i$$

is a common mode component of the output power.

Subtracting the common mode equation from the N equations in formula (1), the following differential mode power balance equation (3) can be obtained:

$$\frac{dE_{difi}}{dt} = v_{bdifi}i_g - P_{difi} \tag{3}$$

where $E_{difi}=E_i-E_{com}$ is dc-link differential mode energy, $v_{bdifi}=v_{bi}-v_{bcom}$ is a differential mode component of the first side voltage, and $P_{difi}=P_i-P_{com}$ is an output power differential mode component.

The common mode circuit equation including the grid-side current state is shown in the following equation (4):

$$\begin{cases} L\dfrac{di_g}{dt} = v_g - Nv_{bcom} \\ \dfrac{dE_{com}}{dt} = v_{bcom}i_g - P_{com} \end{cases} \tag{4}$$

The prerequisite for the normal operation of the conversion system is that the above equation can reach a steady state, that is, the common mode power absorbed by the bridge arm is balanced with the output common mode power, and the differential mode power absorbed by the bridge arm is balanced with the output differential mode power.

According to the above formula (4), the grid current can be controlled by $v_{bcom}$, thereby controlling the total power or common mode power flowing into all power converters. According to the above formula (3), the differential mode power can be controlled by $v_{bdifi}$. Since the dc-link voltage reflects the energy of the dc-link capacitor, the stable operation of the circuit can be achieved through closed-loop feedback control of the dc-link voltage.

A cascaded H-bridge uses power converters connected in series to deal with medium to high voltage situations, and the voltage stress of each power converter device is determined by its respective dc-link voltage. In order to prevent a unit from overvoltage, it is necessary to control the N dc-link voltages to be consistent, which is the dc-link voltage equalization problem, and which is a main challenge of cascaded H-bridge control. The differential mode power can be controlled by using $v_{bdifi}$, and combined with the closed-loop feedback of the dc-link voltages, the dc-link voltage balance is achieved.

Based on the above analysis of the power stability problem and voltage balance problem, the control principle of the controller is introduced combined with the two cases in the first embodiment, respectively.

For the first case, the N controllers are marked as (N−1) controllers and a first controller, and the specific control principles of the (N−1) controllers and the first controller are introduced below.

Each of the (N−1) controllers includes a calculating unit, a command generating unit and a modulating unit. The calculating unit is configured to calculate a local common mode signal according to the neighboring direct current voltage signal and the second side voltage of the corresponding power converter. The command generating unit is configured to generate a control command according to the local common mode signal, and the first side current and the second side voltage of the corresponding power converter. The modulating unit is configured to perform modulation on the control command, to generate the control signal.

Preferably, the modulating unit is configured to perform carrier phase shift modulation on the control command to generate the control signal. When performing the carrier phase shift modulation on the control command to generate the control signal, the use of fully distributed control can reduce the loading delay in each power converter, thereby increasing the control bandwidth.

The calculating unit performs a weighted average on second side voltages of the other M power converters and the second side voltage of the corresponding power converter, to obtain the local common mode signal. Since each controller can only obtain the second side voltage of part of the other (N−1) power converters, it cannot obtain the second side voltages of all the other (N−1) power converters. Compared with calculating the common mode signal according to the second side voltages of the N power converters, the local common mode signal is calculated based on the second side voltages of the (N−1) power converters at most. Because the local common mode signal is used here, there is no need to obtain the voltages of all the other power converters, and there is no need to collect the second side voltages of all the power converters by the central controller and then calculate the common mode signal according to the second side voltages of all the power converters, so that the converter provided by the present application can adopt fully distributed control.

More specifically, the local common mode signal is calculated according to the following formula:

$$v_{dccomi} = \rho_i v_{dci} + \sum_{j \in Neb(i)} \rho_j v_{dcj} \qquad (5)$$

where $v_{dccomi}$ represents the local common mode signal, Neb(i) represents a neighbor of node i, that is, the node corresponding to the voltage resolved from the neighboring direct current voltage signal received by node i, that is, if node i receives information of node j, then node j is called a neighbor of node i.

In formula (5), $\rho_i$ is a weighting coefficient, $$\rho_i > 0, \rho_j > 0, \rho_i + \sum_{j \in Neb(i)} \rho_j = 1,$$

preferably $$\rho_i = \rho_j = \frac{1}{N_i + 1}, N_i$$

is the number of neighbors.

The following takes the transmission structure of a chain spanning tree and the transmission structure of a broadcast spanning tree as examples to illustrate the process of obtaining a local common mode signal.

In the transmission structure of the chain spanning tree, node 1 is the root node, and node 2 to node N are the follower nodes. The adjacent upstream node (i−1) of each follower node is the neighbor node. For the second to N-th controllers, the local common mode signal is calculated according to the following formula:

$$v_{dccomi} = \frac{v_{dci} + v_{dc(i-1)}}{2} \qquad (6)$$

In the transmission structure of the broadcast spanning tree, node 1 is the root node, and nodes 2 to N are the follower nodes. Node 1 is a neighbor node for node 2 to node N. For the follower node, the local common mode signal is calculated according to the following formula:

$$v_{dccomi} = \frac{v_{dci} + v_{dc1}}{2} \qquad (7)$$

In the transmission structures of the chain spanning tree and the broadcast spanning tree, the first controller includes a command generating unit and a modulating unit. The first controller corresponds to the root node. The command generating unit in the first controller is configured to generate a control command according to the first side current and the second side voltage of the corresponding power converter. The modulating unit is configured to perform modulation on the control command to generate a control signal.

The specific control principles of the command generating unit in the (N−1) controllers and the first controller are introduced below. When the transmission structure among the N controllers is a spanning tree, reference can be made to FIG. 9 for a control principle diagram of the follower node. Reference can be made to FIG. 10 for a control principle diagram of the root node.

Figure 9:
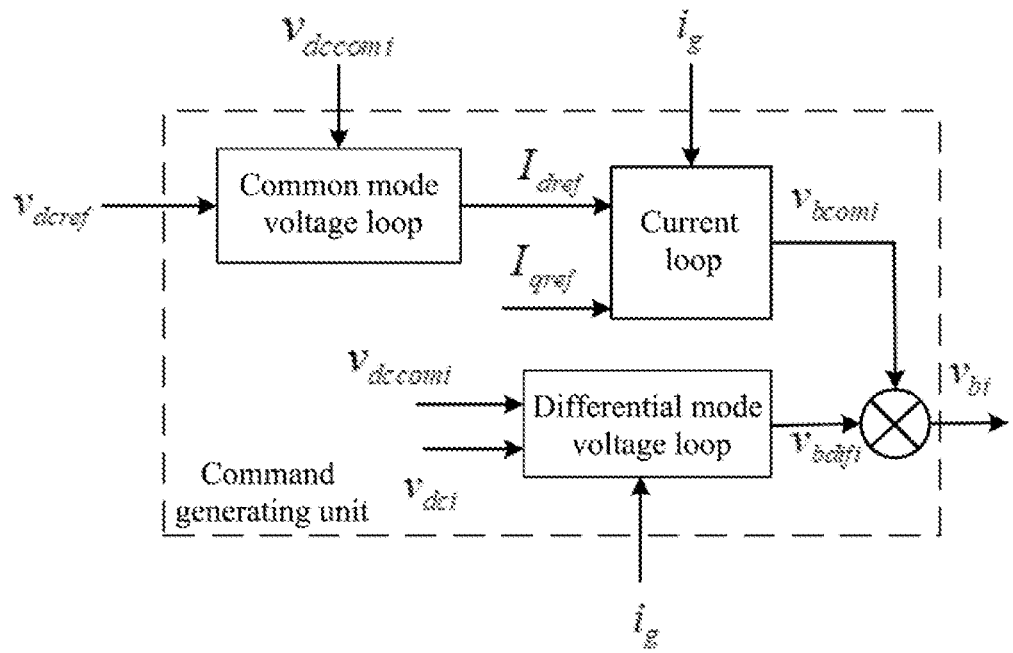
FIG. 9 is a schematic diagram of a control principle of a command generating unit provided by a fourth embodiment of the present application.
Figure 10:
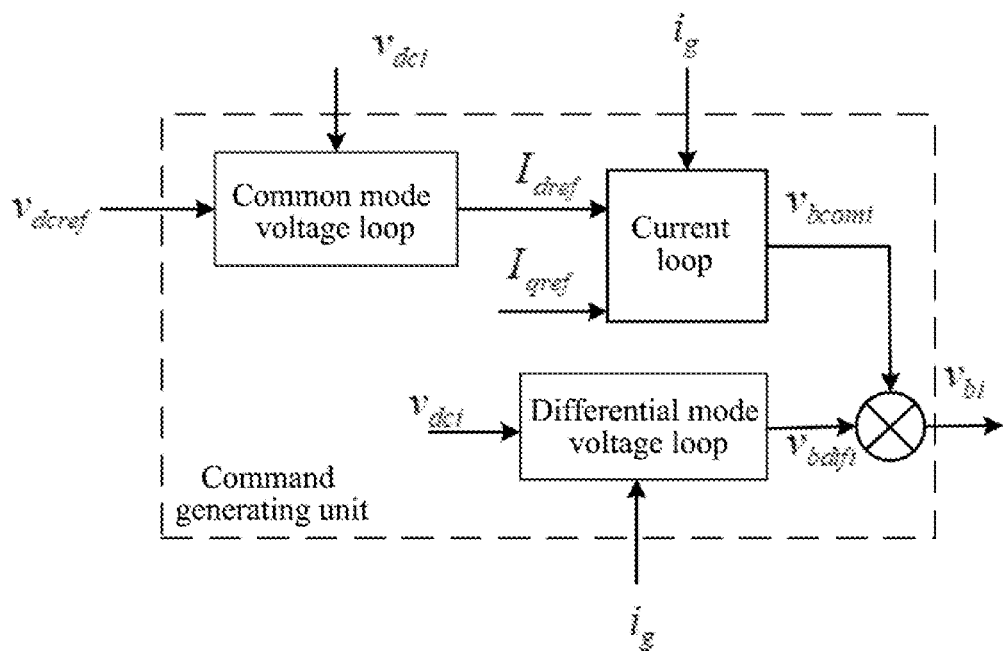
FIG. 10 is a schematic diagram of a control principle of another command generating unit provided by the fourth embodiment of the present application.

More specifically, as shown in FIG. 9, the command generating units in the (N−1) controllers include a common mode voltage loop, a current loop and a differential mode voltage loop. The common mode voltage loop is configured to generate a given signal $I_{dref}$ according to a local common mode signal $v_{dccomi}$ and a preset voltage reference value $v_{dcref}$. The current loop is configured to generate a common mode command $v_{bcomi}$ according to a preset current reference value $I_{qref}$, the given signal $I_{dref}$ and a first side current $I_g$ of the corresponding power converter. The differential mode voltage loop is configured to generate a differential mode command $v_{bdifi}$ according to the local common mode signal $v_{dccomi}$, and a second side voltage $V_{dci}$ and the first side current $i_g$ of the corresponding power converter. A command synthesis unit is configured to perform a calculation on the common mode command $v_{bcomi}$ and the differential mode command $v_{bdifi}$ and generate a control command $V_{bi}$.

As shown in FIG. 10, the command generating unit in the first controller also includes a common mode voltage loop, a current loop and a differential mode voltage loop. The common mode voltage loop is configured to generate a given signal $I_{dref}$ according to a second side voltage $v_{dci}$ of the corresponding power converter and a preset voltage reference value $V_{dcref}$. The current loop is configured to generate a common mode command $v_{bcomi}$ according to a preset current reference value $I_{qref}$, the given signal $I_{dref}$ and a first side current $I_g$ of the corresponding power converter. The differential mode voltage loop is configured to generate a differential mode command $v_{bdifi}$ according to the second side voltage $v_{dci}$ and the first side current $i_g$ of the corresponding power converter. The command synthesis unit is configured to perform a calculation on the common mode command $v_{bcomi}$ and the differential mode command $v_{bdifi}$, and generate a control command $v_{bi}$.

For the second case, the specific control principle of each controller is the same as the specific control principle of the (N−1) controllers in the first case, and reference can be made to FIG. 9.

In the following, the process of obtaining the local common mode signal will be explained by taking the information transmission structure being a balanced diagram of a unidirectional ring type and a balanced diagram of a bidirectional ring type as examples.

The information transmission structure among N controllers is of a unidirectional ring type, that is, there is no root node among the nodes. The upstream node (i−1) adjacent to each node is a neighbor node, and the local common mode signal is calculated according to the following formula:

$$v_{dccomi} = \frac{v_{dci} + v_{dc(i-1)}}{2} \qquad (8)$$

The information transmission structure among N controllers is of a bidirectional ring type, the upstream node (i−1) and downstream node (i+1) adjacent to each node are neighbor nodes, and the local common mode signal is calculated according to the following formula:

$$v_{dccomi} = \frac{v_{dci} + v_{dc(i-1)} + v_{dc(i+1)}}{3} \tag{9}$$

In the embodiment of the present application, each controller calculates the local common mode voltage signal according to the second side voltage of the corresponding power converter and the second side voltage of no more than other (N−2) power converters, and then generates a corresponding control command according to the local common mode voltage signal, and the second side voltage and the first side current of the corresponding power converter. There is no need to collect the second side voltages of all power converters by the central controller to obtain a common mode voltage signal, so that the conversion system provided by the embodiment of the present application can adopt fully distributed control.

The following continues to describe the conversion system 200 provided in a fifth embodiment of the present application. The system includes N power converters 201 and N controllers 202.

Figure 11:
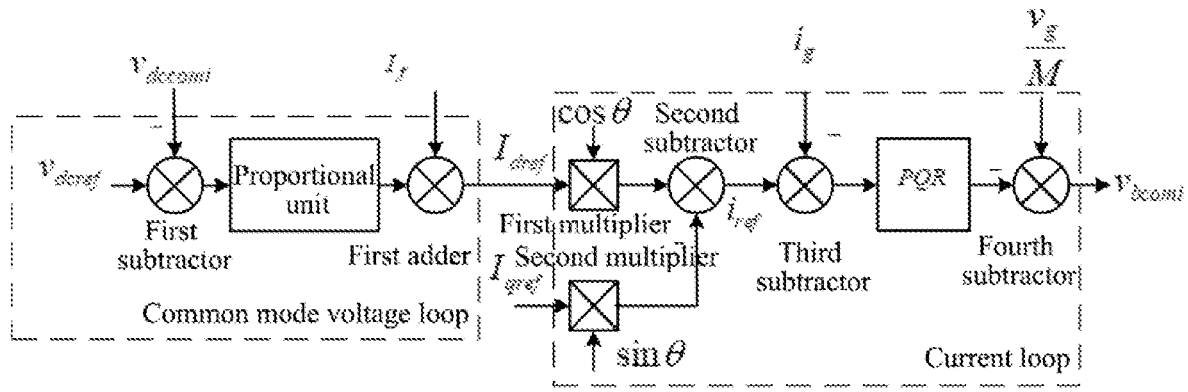
FIG. 11 is a schematic diagram of part of a control principle of another command generating unit provided by a fifth embodiment of the present application.

The fifth embodiment further describes a specific control principle of the command generating unit on the basis of the fourth embodiment. As shown in FIG. 11, a common mode voltage loop generates a given signal $I_{dref}$ according to a local common mode signal $V_{dccomi}$ a preset voltage reference value $V_{dcref}$ and an active current feed-forward value at the first side of the corresponding power converter. The use of the active current feed-forward value can improve the dynamic response when the load changes suddenly. The current loop is configured to generate a common mode command $V_{bcomi}$ according to a preset current reference value $I_{qref}$, the given signal $I_{dref}$ and the first side current $i_g$ of the corresponding power converter.

The common mode voltage loop includes a first subtractor, a proportional unit and a first adder. The first subtractor is configured to subtract the local common mode signal $V_{dccomi}$ from the preset voltage reference value $v_{dcref}$ to obtain a fourth intermediate variable. The proportional unit is configured to proportionally control the fourth intermediate variable to obtain a fifth intermediate variable. The first adder is configured to add the fifth intermediate variable and the active current feed-forward value $I_f$ of the corresponding power converter to obtain the given signal $I_{dref}$.

The current loop includes a first multiplier, a second multiplier, a second subtractor, a third subtractor, a fourth subtractor and a proportional quasi-resonant controller. The first multiplier is configured to multiply the given signal $I_{dref}$ and a cosine of the phase of the grid voltage, to obtain a sixth intermediate variable. The second multiplier is configured to multiply the preset current reference value $I_{qref}$ and a sine of the phase of the grid voltage, to obtain a seventh intermediate variable. The second subtractor is configured to subtract the seventh intermediate variable from the sixth intermediate variable to obtain an eighth intermediate variable $i_{ref}$. The third subtractor is configured to subtract the eighth intermediate variable $i_{ref}$ from the first side current $i_g$ of the corresponding power converter, to obtain a ninth intermediate variable. The proportional quasi-resonant controller is configured to perform proportional quasi-resonant control on the ninth intermediate variable, to obtain a tenth intermediate variable. The fourth subtractor is further configured to subtract the tenth intermediate variable from the grid voltage feed-forward value $$\frac{v_g}{M},$$

to obtain the common mode command $v_{bcomi}$.

Since each controller adopts a current loop, and there's only one current for the circuit, it is impossible for each controller to achieve the control with non-static error. Therefore, the current loop uses a Proportional Quasi-Resonant (PQR) controller.

According to an average power of the direct current side (the second side) of the power converter and a voltage amplitude of the alternating current side (the first side), the active current feed-forward value at the first side of the power converter is obtained, that is, the active current feed-forward value is calculated according to the following formula (10).

$$I_f = i_{dccomi} \frac{2v_{dci}}{v_{gM}} \tag{10}$$

where $I_f$ represents the active current feed-forward value, $i_{dccomi}$ represents a common mode component of a current of the dc-link capacitor, $V_{dci}$ represents a voltage of a dc-link capacitor, and $V_{gM}$ represents an alternating current voltage amplitude of the grid.

The grid voltage feed-forward value is calculated according to the following formula:

$$v_{fg} = \frac{v_g}{M} \tag{11}$$

where M represents the number of the received neighbor direct current voltages, and $v_g$ represents the alternating current voltage of the grid.

Figure 21:
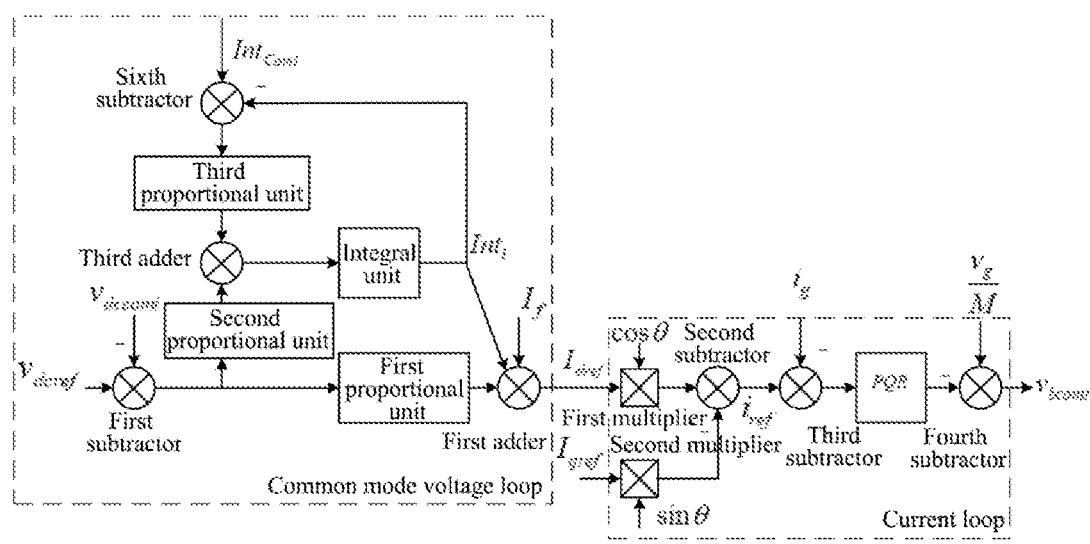
FIG. 21 is a schematic diagram of part of a control principle of another command generating unit provided by the fifth embodiment of the present application.

As shown in FIG. 21, in an embodiment, a coordinated integral part may be added on the basis of the common mode voltage loop shown in FIG. 11. More specifically, the common mode voltage loop generates a given signal $I_{dref}$ according to a local common mode signal $v_{dccomi}$, a preset voltage reference value $v_{dcref}$, a local integral signal and an active current feed-forward value at the first side of the corresponding power. The current loop is configured to generate a common mode command $v_{bcomi}$ according to a preset current reference value $I_{qref}$, the given signal $I_{dref}$ and a first side current $i_g$ of the corresponding power converter.

The common mode voltage loop includes a first subtractor, a first proportional unit, a second proportional unit, a sixth subtractor, a third proportional unit, a first adder, a third adder and an integral unit. The first subtractor is configured to subtract the local common mode signal $v_{dccomi}$ from the preset voltage reference value $v_{dcref}$ to obtain a fourth intermediate variable. The first proportional unit is configured to proportionally control the fourth intermediate variable according to a first proportional coefficient to obtain a fifth intermediate variable. The second proportional unit is configured to proportionally control the fourth intermediate variable according to a second proportional coefficient to obtain an eleventh intermediate variable. The sixth subtractor is configured to subtract a local integral signal $Int_i$ from a local common mode integral signal $Int_{comi}$ to obtain an integral error. The third proportional unit is configured to proportionally control the integral error according to a third proportional coefficient to obtain a twelfth intermediate variable. The third adder is configured to add the twelfth intermediate variable and the eleventh intermediate variable to obtain a thirteenth intermediate variable. The integral unit is configured to integrally control the thirteenth intermediate variable to obtain the local integral signal $Int_i$. The first adder is configured to add the fifth intermediate variable, the active current feed-forward value at the first side of the corresponding power converter and the local integral signal to obtain the preset current reference value.

The local common mode integral signal is obtained by weighted-averaging local integral signals generated by common mode voltage loops in other M controllers and a local integral signal generated by a common mode voltage loop in a current controller, and the other M controllers are neighbor controllers of the current controller.

The structure of the current loop is the same as the common mode voltage loop shown in FIG. 11, and will not be repeated here.

By adding the coordinated integral part to the common mode voltage loop, the steady-state error of the common mode voltage loop can be eliminated, thereby improving the control accuracy of the controller and improving the performance of the conversion system.

The following takes different transmission structures as examples to illustrate the process of obtaining a local common mode integral signal.

In the transmission structure of the chain spanning tree, node 1 is the root node, and node 2 to node N are the follower nodes. The adjacent upstream node (i−1) of each follower node is the neighbor node. For the second to N-th controllers, the local common mode integral signal is calculated according to the following formula:

$$Int_{comi} = \frac{Int_i + Int_{(i-1)}}{2} \qquad (12)$$

In the transmission structure of the broadcast spanning tree, node 1 is the root node, and nodes 2 to N are the follower nodes. Node 1 is a neighbor node for node 2 to node N. For the follower node, the local common mode integral signal is calculated according to the following formula:

$$Int_{comi} = \frac{Int_i + Int_1}{2} \qquad (13)$$

In the transmission structure of the balanced diagram with a unidirectional ring type, there is no root node among the nodes. The upstream node (i−1) adjacent to node i is a neighbor node, and the local common mode integral signal for node i is calculated according to the following formula:

$$Int_{comi} = \frac{Int_i + Int_{(i-1)}}{2} \qquad (14)$$

In the transmission structure of the balanced pattern with a bidirectional ring type, the upstream node (i−1) and downstream node (i+1) adjacent to node i are neighbor nodes, and the local common mode integral signal for node i is calculated according to the following formula:

$$Int_{comi} = \frac{Int_{(i+1)} + Int_i + Int_{(i-1)}}{3} \qquad (15)$$

Figure 12:
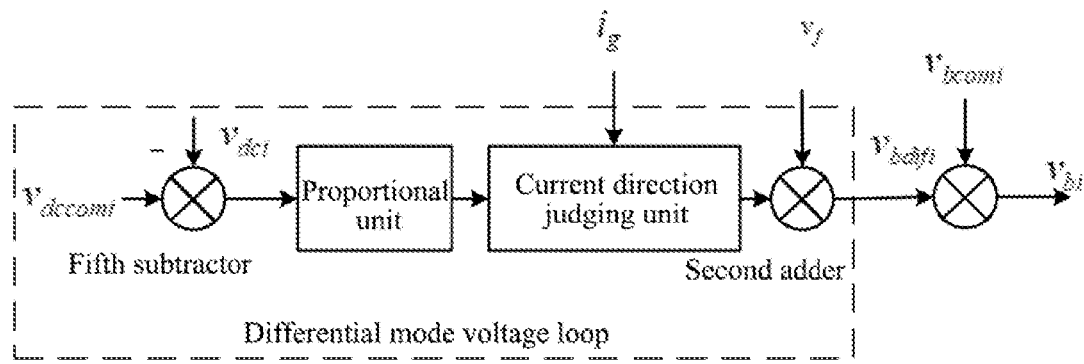
FIG. 12 is a schematic diagram of a control principle of a differential mode voltage loop provided by the fifth embodiment of the present application.

As shown in FIG. 12, a differential mode voltage loop generates a differential mode command $v_{bdifi}$ according to a local common mode signal $V_{dccomi}$, the second side voltage $V_{dci}$ and the first side current $i_g$ of the corresponding power converter, and a differential mode voltage feed-forward value $v_f$ of the corresponding power converter. The differential mode voltage loop specifically includes: a fifth subtractor, a proportional unit, a current direction judging unit and a second adder.

The fifth subtractor is configured to subtract the second side voltage $V_{dci}$ of the corresponding power converter from the local common mode signal $V_{dccomi}$, and obtains a first intermediate variable. The proportional unit is configured to multiply the first intermediate variable and a proportional coefficient $k_d$ and obtains a second intermediate variable. The current direction judging unit is configured to obtain an intermediate value according to a direction of the first side current $i_g$ of the corresponding power converter, and multiply the intermediate value and the second intermediate variable to obtain a third intermediate variable. The second adder is configured to add the third intermediate variable and the differential mode voltage feed-forward value of the corresponding power converter, to obtain the differential mode command.

It should be noted that the third intermediate variable can be directly output as a differential mode command without considering the differential mode voltage feed-forward value.

The differential mode voltage feed-forward value is calculated according to a differential mode power of the direct current side (the second side) and a current amplitude of the alternate current side (the first side), and the differential mode voltage feed-forward value is calculated according to the following formula:

$$v_f = i_{dcdifi}\frac{2v_{dccomi}}{I_{gM}} \qquad (16)$$

where $b_f$ represents the differential mode voltage feed-forward value, $i_{dcdifi}$ represents a differential mode component of a current of the dc-link capacitor, $i_{dcdifi}=i_{dci}-i_{dccomi}$, $i_{dci}$ represents the current of the dc-link capacitor in the i-th power converter, $i_{dccomi}$ is a common mode direct current output current which is calculated in the same way as the common mode voltage, and $I_{gM}$ represents the current amplitude of the first side of the corresponding power converter.

The current direction judging unit obtains the intermediate value according to the following formula:

$$\text{sign}(i_g) = \begin{cases} 1; & i_g > 0 \\ 0; & i_g = 0 \\ -1; & i_g < 0 \end{cases} \qquad (17)$$

where the current direction judging unit obtains the third intermediate variable according to the following formula:

$$v_Z = -k_d v_{dcdifi}\text{sign}(i_g) \qquad (18)$$

where $v_Z$ represents the third intermediate variable, $V_{dcdifi}=V_{dci}-V_{dccomi}$, $V_{dcdifi}$ represents a differential mode component of a voltage of the dc-link capacitor in the i-th power converter, and $k_d$ represents a proportional coefficient.

The local differential mode voltage loop is an important part of the controller, which involves the voltage balance of various dc-link capacitors in the conversion system. The following takes the non-leader mode of unidirectional ring communication as an example to illustrate a design method of proportional control parameters in the local differential mode voltage loop.

First, a mathematical model of voltage equalization is established:

$$\frac{d}{dt} v_{dc} = -L_{LL} v_{dc} e^{-s\tau} \tag{19}$$

$$L_{LL} = \frac{\alpha k_d}{2} \begin{bmatrix} 1 & 0 & \ldots & -1 \\ -1 & 1 & \ldots & 0 \\ 0 & \ldots & \ldots & 0 \\ 0 & 0 & -1 & 1 \end{bmatrix} \tag{20}$$

$$\alpha = \frac{2}{\pi} \frac{I_{gM}}{C v_{dc0}} \tag{21}$$

where $L_{LL}$ is a Laplace matrix which is related to communication architecture among the controllers, $I_{gM}$ is the current amplitude of the alternate current side, $v_{dc0}$ is a voltage rating of the dc-link capacitor, and C is a capacitance of the dc-link capacitor.

Eigenvalues of the Laplace matrix $L_{LL}$ are obtained as follows:

$$\lambda_k(L_{LL}) = \frac{\alpha k_d}{2}\left(1 - e^{j\frac{2\pi}{N}i}\right), k = 1, 2, \ldots, N \tag{22}$$

The stability of the voltage equalization loop of the conversion system is equivalent to the stability of unit negative feedback coefficients corresponding to the following N open-loop transfer functions.

$$G(s) = \lambda_k(L_{LL}) \frac{e^{-s\tau}}{s} \tag{23}$$

Hence, a stability range of the proportional coefficient $k_d$ is as follows:

$$0 < k_d < \frac{\frac{\pi}{N}}{\sin\frac{\pi}{N}} \frac{1}{\alpha \tau} \tag{24}$$

where $k_d$ represents the proportional coefficient, $\tau$ represents a communication time interval, $$\alpha = \frac{2}{\pi} \frac{I_{gM}}{C v_{dc0}}, I_{gM}$$

the current amplitude of the first side of the corresponding power converter, $v_{dc0}$ represents the rated value of the second side voltage of the corresponding power converter, and C represents the capacitance of the capacitor in the corresponding power converter. Preferably, $$k_d = \frac{1}{4\alpha\tau}.$$

It can be seen from the above formula that the larger the communication delay, the narrower the stability range, the more the number of power converters, the narrower the stability range, but the change is not obvious as the number of power converters increases. The value of $k_d$ should be in the stability range, and is specifically designed by a compromise between dynamic response speed and stability.

Figure 13:
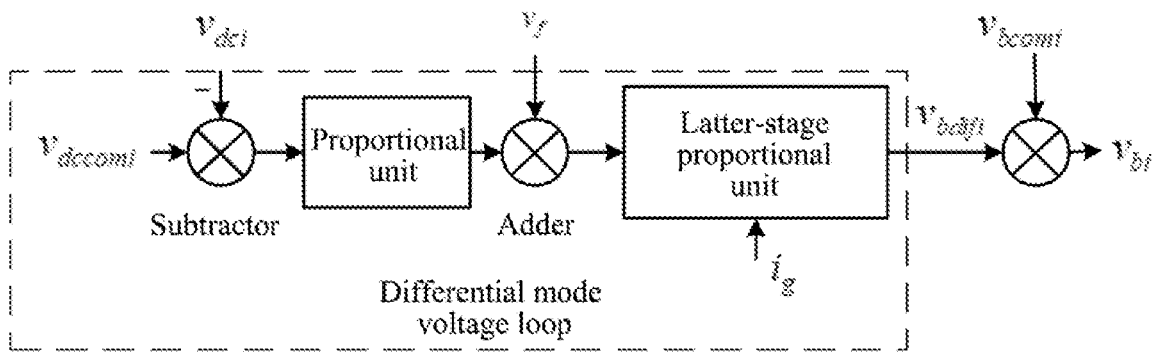
FIG. 13 is a schematic diagram of a control principle of another differential mode voltage loop provided by the fifth embodiment of the present application.

As shown in FIG. 13, the differential mode voltage loop can also adopt the following control principle: the subtractor subtracts the second side voltage $v_{dci}$ of the corresponding power converter from the local common mode signal $v_{dccomi}$, and obtains a first intermediate variable. The proportional unit multiplies the first intermediate variable and the proportional coefficient $k_d$, and obtains the second intermediate variable. The second intermediate variable is added with the differential mode voltage feed-forward value $v_f$ of the corresponding power converter by the adder, and then passes through a latter-stage proportional unit to obtain the differential mode command. The differential mode voltage feed-forward value $v_f$ can be calculated according to formula (16). The proportional coefficient of the latter-stage proportional unit changes with the first side current of the power converter, which is specifically as shown in formula (25):

$$k_t = \frac{0.5 I_{gM}}{i_g} \tag{25}$$

where $k_t$ represents the proportional coefficient of the latter-stage proportional unit.

Figure 14:
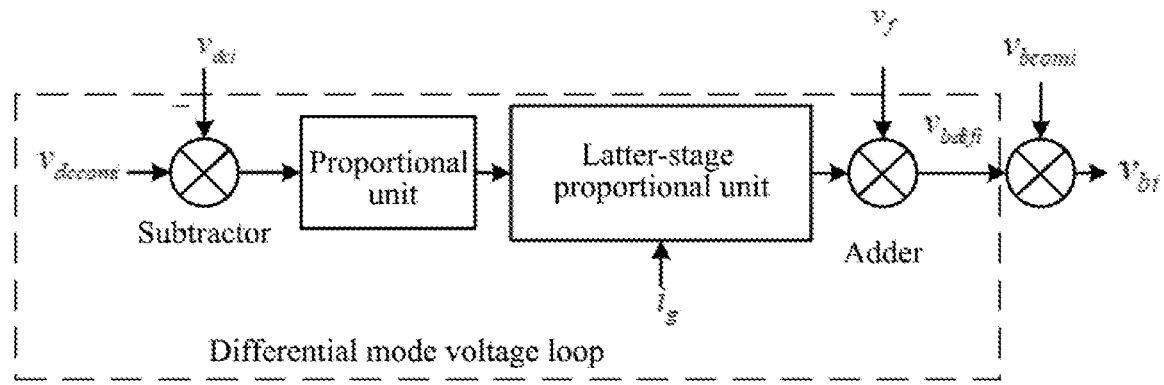
FIG. 14 is a schematic diagram of a control principle of another differential mode voltage loop provided by the fifth embodiment of the present application.

As an alternative, as shown in FIG. 14, the differential mode voltage loop can also adopt the following control principle. The subtractor subtracts the second side voltage $V_{dci}$ of the corresponding power converter from the local common mode signal $v_{dccomi}$, and obtains the first intermediate variable. The proportional unit multiplies the first intermediate variable and the proportional coefficient $k_d$, and obtains the second intermediate variable. The second intermediate variable passes through the latter-stage proportional unit, and then is added to the differential mode voltage feed-forward value $v_f$ of the corresponding power converter to obtain the differential mode command. The proportional coefficient of the latter-stage proportional unit is determined according to the formula (25).

The differential mode voltage feed-forward value $v_f$ shown in FIG. 14 can be calculated according to the following formula (26).

$$v_f = i_{dedifi} \frac{v_{dccomi}}{i_g} \tag{26}$$

In the conversion system provided by the embodiment of the application, in order to solve the problem that the current of each converter cannot be independently and freely controlled, on the one hand, the local common mode voltage feedback instead of the voltage of each converter itself is used in the common mode voltage loop, so that the output of each local common mode voltage loop is basically the same to a certain extent. On the other hand, the current loop uses controllers with static error, such as proportional control, proportional quasi-resonant controller, etc., and does not use the controller that completely eliminates the static error, such as the proportional integral controller, the proportional resonance controller, etc., so that the current setting and current feedback can have a certain error to deal with the slight difference in the local common mode voltage loop output of each converter, so that the current control of respective converters will not conflict.

Figure 15:
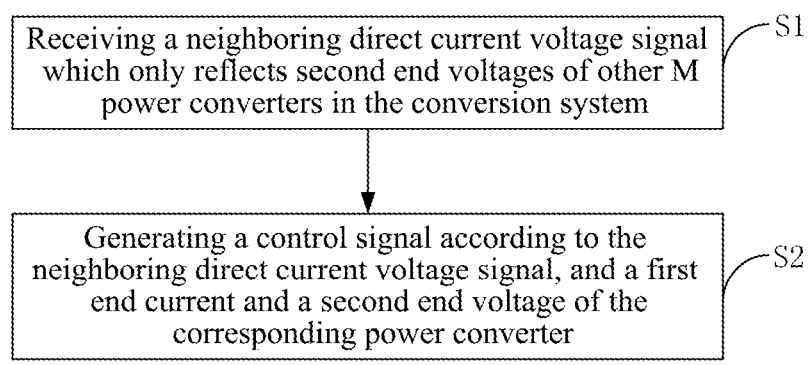
FIG. 15 is a schematic flowchart of a control method provided a sixth embodiment of the present application.

As shown in FIG. 15, a sixth embodiment of the present application also provides a control method for controlling a conversion system. For the structure of the conversion control system, refer to the description in the foregoing embodiments. The control method includes:

S1, each of at least (N−1) controllers receives a neighboring direct current voltage signal which only reflects second side voltages of other M power converters in the conversion system.

N≥3, 1≤M≤(N−2), and M and N are integers. That is, each of at least (N−1) controllers can only obtain the second side voltage of some of the other (N−1) power converters, but cannot obtain the second side voltage of all of the other (N−1) power converters.

S2, each of at least (N−1) controllers generates a control signal for controlling a first side voltage of a corresponding power converter according to the neighboring direct current voltage signal, and a first side current and a second side voltage of the corresponding power converter.

Each of at least (N−1) controllers resolves the second side voltages of other M power converters from the neighboring direct current voltage signal, and generates the control signal according to the second side voltages of other M power converters, and the first side current and the second side voltage of the corresponding power converter. The control signal is configured to control the first side voltage of the corresponding power converter.

In the control method provided by the embodiments of the present application, each controller does not need to obtain the voltages of all other power converters, which can greatly reduce the number of connections between the controllers and further improve the reliability of the conversion system.

A seventh embodiment of the present application also provides a control method for controlling a conversion system. For the structure of the conversion control system, refer to the foregoing embodiments. The control method includes:

S10, each of at least (N−1) controllers receives a neighboring direct current voltage signal which only reflects second side voltages of other M power converters in the conversion system.

This step has been described in detail in S1, and will not be repeated herein again.

S20, each of at least (N−1) controllers generates a control signal for controlling a first side voltage of a corresponding power converter according to the neighboring direct current voltage signal, a first side current and a second side voltage of the corresponding power converter.

The process of generating the control signal specifically includes S11 to S13.

S11, a local common mode signal is calculated according to the neighboring direct current voltage signal and the second side voltage the corresponding power converter.

A weighted average is performed on the second side voltages of the other M power converters and the second side voltage of the corresponding power converter, to obtain the local common mode signal. Preferably, each of the second side voltages has an equal weight which is 1/N.

Each controller can only obtain the second side voltage of some of the other (N−1) power converters, and cannot obtain the second side voltage of all of the other (N−1) power converters. Compared with calculating the common mode signal based on the second side voltages of N power converters, the local common mode signal is calculated based on the second side voltages of at most (N−1) power converters in this embodiment.

S12, a control command is generated according to the local common mode signal, and the first side current and the second side voltage of the corresponding power converter.

The process of generating control command specifically includes S121 to S124.

S121, a given signal is generated according to the local common mode signal and a preset voltage reference value.

A proportional control is performed after subtracting the local common mode signal from the preset voltage reference value, and then a proportional control result is superimposed with an active current feed-forward value at the first side of the corresponding power converter, to obtain the given signal $I_{dref}$.

In an embodiment, S121 specifically includes the following steps. The local common mode signal is subtracted from the preset voltage reference value to obtain a fourth intermediate variable. The fourth intermediate variable is proportionally controlled according to a first proportional coefficient to obtain a fifth intermediate variable. The fourth intermediate variable is proportionally controlled according to a second proportional coefficient to obtain an eleventh intermediate variable. A local integral signal is subtracted from a local common mode integral signal to obtain an integral error. The integral error is proportionally controlled according to a third proportional coefficient to obtain a twelfth intermediate variable. The twelfth intermediate variable and the eleventh intermediate variable are added to obtain a thirteenth intermediate variable. The thirteenth intermediate variable is integrally controlled to obtain the local integral signal. The fifth intermediate variable, the active current feed-forward value at the first side of the corresponding power converter and the local integral signal are added to obtain the given signal. The local common mode integral signal is obtained by weighted-averaging local integral signals generated by common mode voltage loops in other M controllers and a local integral signal generated by a common mode voltage loop in a current controller, and the other M controllers are neighbor controllers of the current controller.

S122, a differential mode command is generated according to the local common mode signal, and the second side voltage and the first side current of the corresponding power converter.

After subtracting the second side voltage $v_{dci}$ of the corresponding power converter from the local common mode signal $v_{dccomi}$, a proportional control is performed and the result of the proportional control is multiplied by a coefficient obtained according to the direction of the first side current $i_g$ of the corresponding power converter, and the result of multiplication is added to the differential mode voltage feed-forward value of the corresponding power converter, to obtain the differential mode command.

S123, a common mode command is generated according to a preset current reference value, a given signal and the first side current of the corresponding power converter.

A common mode command is generated, which specifically includes: a current reference value $i_{ref}$ is obtained according to the preset current reference value $I_{qref}$ and the given signal $I_{dref}$. After subtracting the first side current of the corresponding power converter from the current reference value $i_{ref}$, a proportional quasi-resonant control is performed, and then 1/M of the first side voltage of the corresponding power converter is subtracted from the result of the proportional quasi-resonant control, to obtain the common mode command.

S124, a calculation is performed on the common mode command and the differential mode command, to generate a control command.

S13, a modulation is performed on the control command, to generate a control signal.

Carrier phase shift modulation is performed on the control command, to generate the control signal.

In the control method provided by the embodiments of the present application, since the local common mode signal is adopted, there is no need to obtain the voltages of all other power converters, and there is no need to collect the voltages of all power converters by a central controller and then calculate the common mode signal according to the voltages of all power converters, and thus the converter provided by this application can adopt fully distributed control.

In the following, description will be given with emphasis on the beneficial effects of the conversion system and the control method provided by the embodiments of the present application in combination with specific embodiments.

Figure 16:
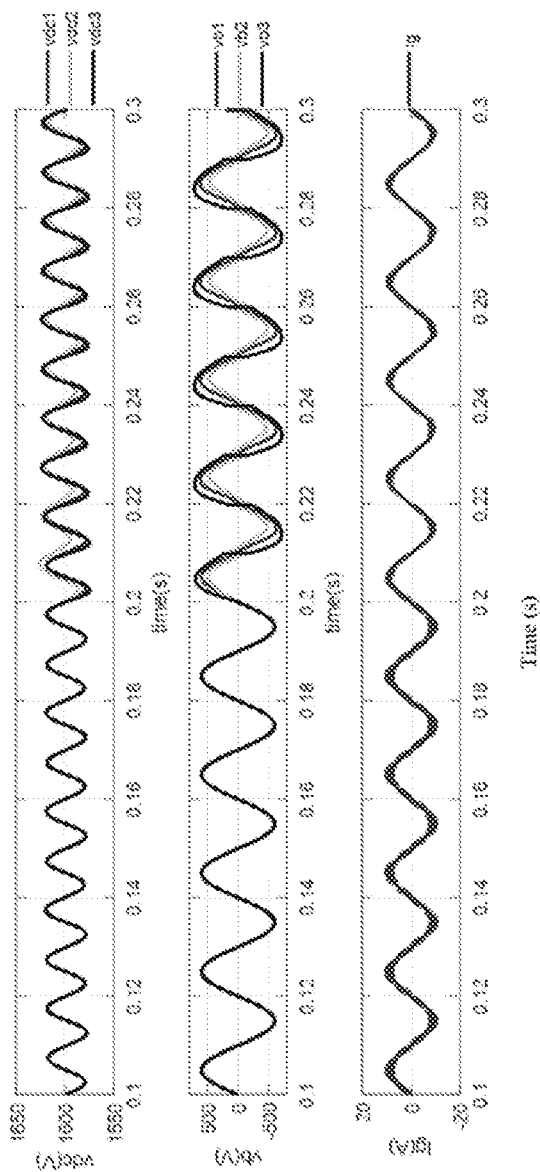
FIG. 16 is a schematic diagram of a bridge arm voltage, a voltage of a direct current link (dc-link) capacitor, and a first side current of each power converter in a conversion system provided by the present application.
Figure 17:
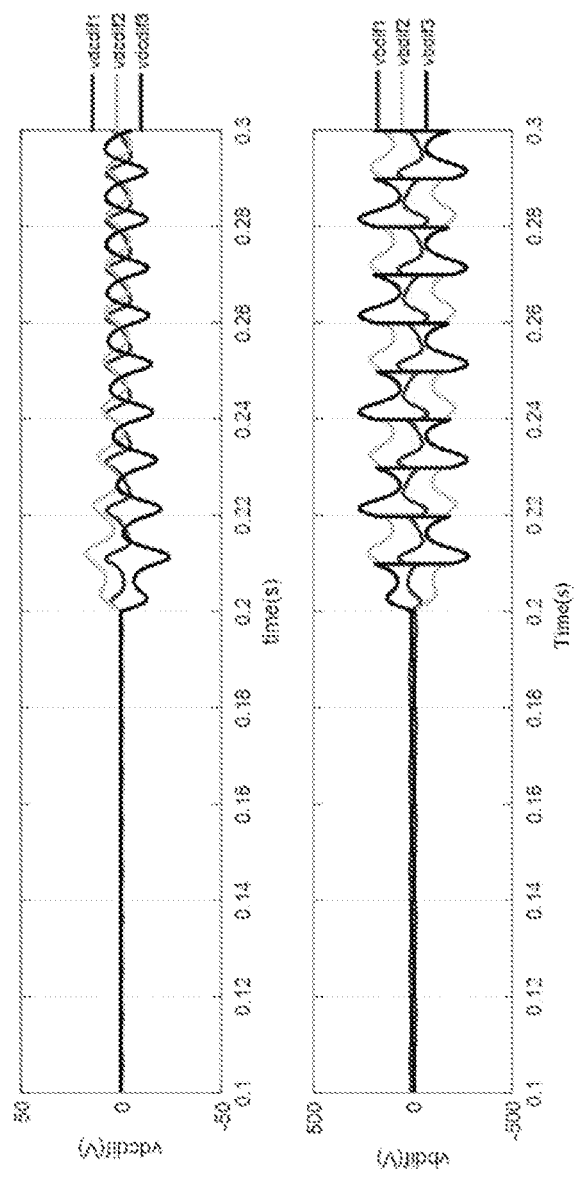
FIG. 17 is a schematic diagram of the differential mode component of the bridge arm voltage of each power converter, and the differential mode component of the voltage of the dc-link capacitor of each power converter in a conversion system provided by the present application.

Taking the information transmission structure being a unidirectional ring network as an example, three power converters are cascaded. As shown in FIGS. 16 and 17, before 0.2 s, the load current of each power converter is 3 A, and after 0.2 s, the second power converter load becomes 2 A, and the third power converter load current becomes 4 A. The simulated waveforms of the voltage of the dc-link capacitor (the second side voltage of the power converter), the bridge arm voltage (the first side voltage of the power converter), and the grid current (the first side current of the power converter) are respectively shown in FIG. 16. The waveforms of the bridge arm voltage and the voltage and the current of the dc-link capacitor satisfy the relationship corresponding to the differential mode control equation. For example, in the time period between 0.2 s and 0.21 s, the current sign is positive, and the differential mode component of the bridge arm voltage and the differential mode component of the voltage of the dc-link capacitor meet a proportional relationship.

Figure 18:
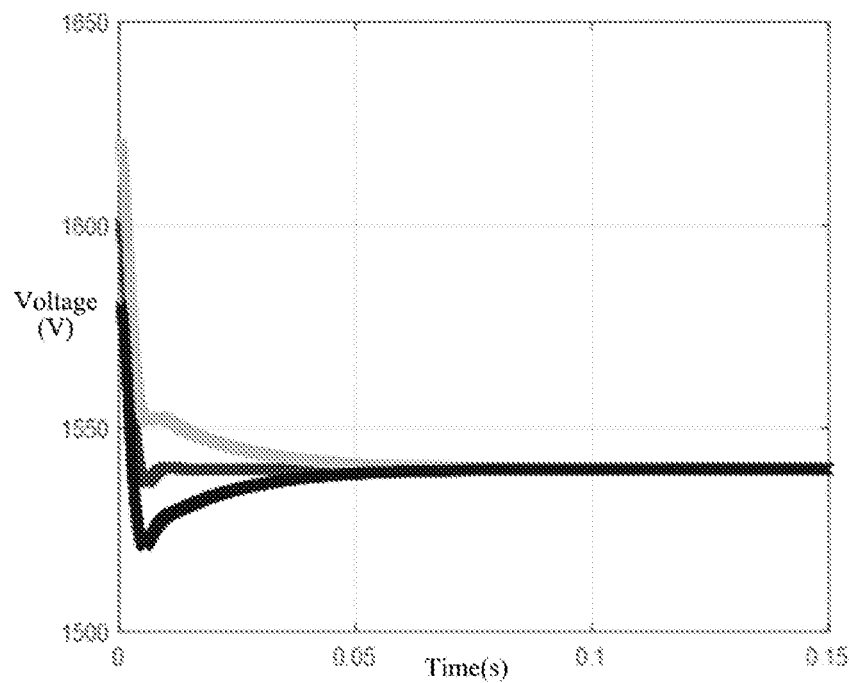
FIG. 18 is a schematic diagram of a voltage equalization effect of a comparative embodiment.

In a partially distributed conversion system in which three power converters are cascaded, the centralized controller sends a common mode voltage signal to each unit controller, and the communication delay affects the control bandwidth. When the communication delay increases, the control bandwidth can only be reduced, the control performance decreases, and the response becomes slower. As shown in FIG. 18, the waveform of the voltage of the dc-link capacitor uses a control period of 100 μs, and the voltage set value of the dc-link capacitor is 1580V. When the communication delay is 200 μs, the dynamic response of the voltage in the partially distributed conversion system becomes slower, the convergence time is greater than 0.03 s, the static error becomes larger, and the deviation from 1580V is large.

Figure 19:
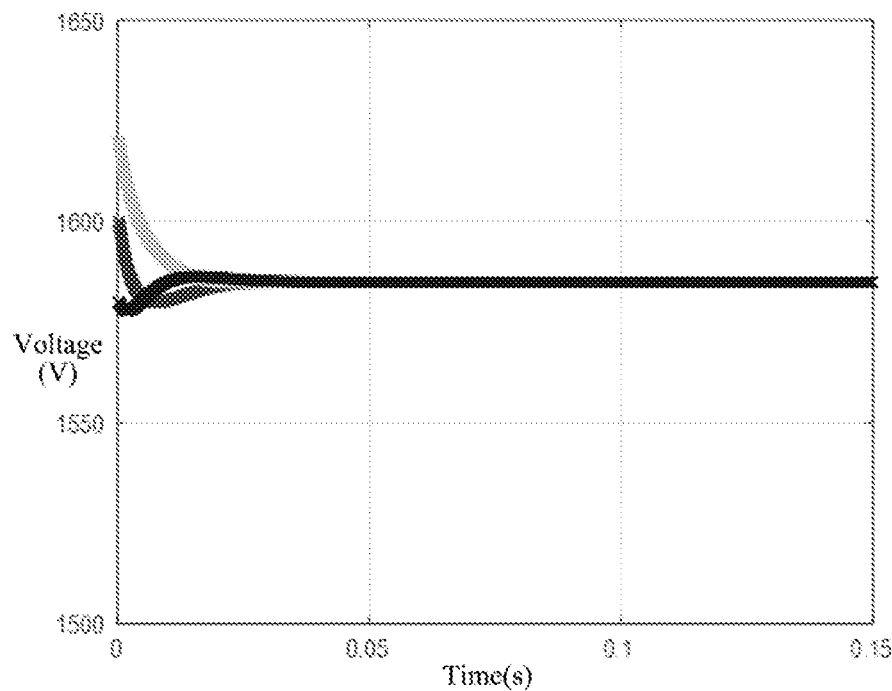
FIG. 19 is a schematic diagram of a voltage equalization effect of an embodiment of the present application.

However, in the fully distributed conversion system provided in this application, the local common mode voltage loop, the current loop, and the local differential mode voltage loop are all implemented in the controller corresponding to each power converter, and are not affected by communication delays, and the communication delay can only affect the control speed of the differential mode voltage equalization loop. As shown in FIG. 19, the waveform of the voltage of the dc-link capacitor has a small deviation from 1580V, and the convergence time is less than 0.025 s.

Compared with FIG. 18, it obviously has a better dynamic response and a smaller static error.

The conversion system usually adopts a carrier phase shift method to form a relatively high equivalent switching frequency, and then generates a control signal according to a control command. For example, the switching frequency of each power converter is f, and the equivalent switching frequency of N power converters can reach 2 Nf. If the centralized control is adopted, the centralized controller needs to have a control frequency of 2 Nf to achieve the effect of controlling each power converter at the control frequency of f. As the switching frequency of power converters increases or the number of power converters increases, the control period of the centralized control is required to be shorter and shorter. The ideal control period Teq of the centralized controller is 1/(2N) of the switching period of the power converter, and it is difficult to meet the demand for high frequency.

Figure 20:
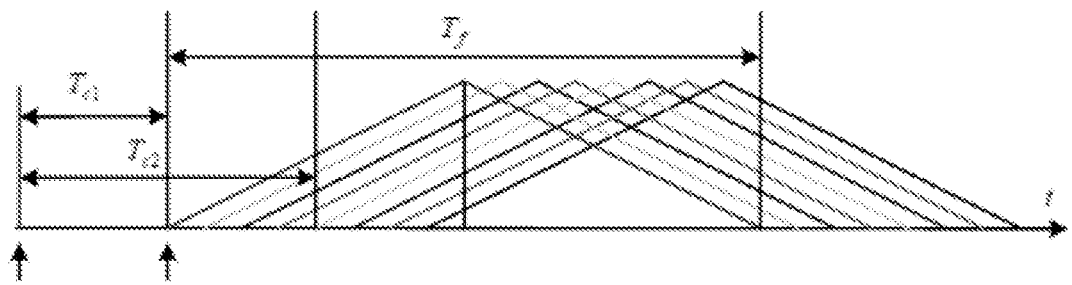
FIG. 20 is a schematic diagram of PWM carriers of respective controllers of an embodiment of the present application.

As shown in FIG. 20, each triangle wave represents the loading signal of a corresponding power converter, and each power converter can only load the control output at its own carrier zero-crossing point. If centralized control is adopted, only the first power converter can load immediately, and all other power converters can only load at the zero-crossing points of their respective carriers, and an average control delay of centralized control reaches Tc2+Tf/2, where Tc2 is a control calculation time of the common mode voltage loop, and Tf is the carrier cycle. If fully distributed control is adopted, each power converter calculates the control value before its carrier zero-crossing point, and then loads the control output, which can reduce the current loop control delay, and the distributed control delay is only Tc1+Tf/2, where Tc1 is a control calculation time of the current loop. The bandwidth can be increased by reducing the current loop control delay. For example, when Tc1=Tf/2, the control bandwidth can be increased by more than 30% due to the reduction of the delay.

In summary, the present disclosure provides a fully distributed control conversion system which does not need a high-performance and high-cost centralized controller, so that the conversion system control is completely modularized in terms of control, and the number of power converters in the conversion system can be flexibly configured to cope with different voltage levels, and it has good scalability. Compared with the centralized control scheme, the risk of single point failure of the controller is reduced. Compared with the existing centralized control or partial distributed control schemes, distributed control reduces the requirements for communication delay and can reduce communication costs. The distributed control adopts local control, which greatly reduces the requirements on chip computing capabilities, especially when applied in carrier phase shift mode, which can greatly improve the response speed of the current loop and the common mode voltage loop. In addition, the present disclosure uses local information instead of global information, and only the voltage of a neighboring power converter needs to be received, then control can be performed, and there's no need to receive the voltages of all other power converters, thus reducing the demand for communication bandwidth.

Finally, it should be noted that the above embodiments are only used to illustrate the technical solutions of the present application, but not to limit them. Although the application has been described in detail with reference to the foregoing embodiments, those of ordinary skill in the art should understand that they can still modify the technical solutions described in the foregoing embodiments, or equivalently replace some or all of the technical features, and these modifications or replacements do not cause the essence of the corresponding technical solutions to deviate from the scope of the technical solutions of the embodiments of the present application.

What is claimed is:

1. A conversion system, comprising:

N power converters, each of the power converters comprising a first side and a second side, the first sides of the N power converters being electrically coupled in series, and N controllers, one-to-one corresponding to the N power converters, and each of the controllers receiving a first side current and a second side voltage of a corresponding power converter, wherein each of at least (N−1) controllers receives a neighboring direct current voltage signal which only reflects second side voltages of other M power converters in the conversion system, and generates a control signal for controlling the first side voltage of the corresponding power converter according to the neighboring direct current voltage signal, and the first side current and the second side voltage of the corresponding power converter, wherein N≥3, 1≤M≤(N−2), and M and N are integers, wherein an information transmission structure among the N controllers is a spanning tree, wherein the N controllers comprise (N−1) controllers and a first controller, each of the (N−1) controllers comprises:
 a calculating unit, configured to calculate a local common mode signal according to the neighboring direct current voltage signal and the second side voltage of the corresponding power converter;
 a command generating unit, configured to generate a control command according to the local common mode signal, and the first side current and the second side voltage of the corresponding power converter; and
 a modulating unit, configured to perform modulation on the control command, to generate the control signal, the first controller comprises:
 a command generating unit, configured to generate a control command according to the first side current and the second side voltage of the corresponding power converter; and
 a modulating unit, configured to perform modulation on the control command, to generate the control signal, wherein the command generating unit of each of the (N−1) controllers comprises:
 a common mode voltage loop, configured to generate a given signal according to the local common mode signal and a preset voltage reference value;
 a current loop, configured to generate a common mode command according to a preset current reference value, the given signal and the first side current of the corresponding power converter;
 a differential mode voltage loop, configured to generate a differential mode command according to the local common mode signal, and the second side voltage and the first side current of the corresponding power converter; and
 a command synthesis unit, configured to perform a calculation on the common mode command and the differential mode command, and generate the control command, the command generating unit of the first controller comprises:
 a common mode voltage loop, configured to generate a given signal according to the second side voltage of the corresponding power converter and a preset voltage reference value;
 a current loop, configured to generate a common mode command according to a preset current reference value, the given signal and the first side current of the corresponding power converter;
 a differential mode voltage loop, configured to generate a differential mode command according to the second side voltage and the first side current of the corresponding power converter; and
 a command synthesis unit, configured to perform a calculation on the common mode command and the differential mode command, and generate the control command.

2. The conversion system according to claim 1, wherein the spanning tree is of a chain type or a broadcast type.

3. The conversion system according to claim 1, wherein the common mode voltage loop generates the given signal according to the local common mode signal, a preset voltage reference value and an active current feed-forward value at the first side of the corresponding power converter.

4. The conversion system according to claim 3, wherein the common mode voltage loop comprises:
 a first subtractor, configured to subtract the local common mode signal from the preset voltage reference value to obtain a fourth intermediate variable;
 a first proportional unit, configured to proportionally control the fourth intermediate variable according to a first proportional coefficient to obtain a fifth intermediate variable;
 a second proportional unit, configured to proportionally control the fourth intermediate variable according to a second proportional coefficient to obtain an eleventh intermediate variable;
 a sixth subtractor, configured to subtract a local integral signal from a local common mode integral signal to obtain an integral error;
 a third proportional unit, configured to proportionally control the integral error according to a third proportional coefficient to obtain a twelfth intermediate variable;
 a third adder, configured to add the twelfth intermediate variable and the eleventh intermediate variable to obtain a thirteenth intermediate variable;
 an integral unit, configured to integrally control the thirteenth intermediate variable to obtain the local integral signal; and
 a first adder, configured to add the fifth intermediate variable, the active current feed-forward value at the first side of the corresponding power converter and the local integral signal to obtain the given signal, wherein the local common mode integral signal is obtained by weighted-averaging local integral signals generated by common mode voltage loops in other M controllers and a local integral signal generated by a common mode voltage loop in a current controller, and the other M controllers are neighbor controllers of the current controller.

5. The conversion system according to claim 1, wherein the differential mode voltage loop generates a differential mode command according to the local common mode signal, the second side voltage and the first side current of the corresponding power converter, and a differential mode voltage feed-forward value of the corresponding power converter.

6. The conversion system according to claim 5, wherein the differential mode voltage loop comprises:
- a subtractor, configured to subtract the second side voltage of the corresponding power converter from the local common mode signal, and obtain a first intermediate variable;
- a proportional unit, configured to multiply the first intermediate variable and a proportional coefficient, and obtain a second intermediate variable;
- a current direction judging unit, configured to obtain an intermediate value according to a direction of the first side current of the corresponding power converter, and multiply the intermediate value and the second intermediate variable to obtain a third intermediate variable;
- an adder, configured to add the third intermediate variable and the differential mode voltage feed-forward value to obtain the differential mode command.

7. The conversion system according to claim 6, wherein the proportional coefficient satisfies the following condition:

$$0 < k_d < \frac{\frac{\pi}{N}}{\sin\frac{\pi}{N}} \frac{1}{\alpha\tau}$$

wherein $k_d$ represents a proportional coefficient, $\tau$ represents a communication time interval, $$\alpha = \frac{2}{\pi} \frac{I_{gM}}{Cv_{dc0}},$$

$I_{gM}$ represents a current amplitude of the first side of the corresponding power converter, $v_{dc0}$ represents a rated value of the second side voltage of the corresponding power converter, C represents a capacitance of a capacitor in the corresponding power converter.

8. The conversion system according to claim 7, wherein $$k_d = \frac{1}{4\alpha\tau}.$$

9. The conversion system according to claim 1, wherein the calculating unit performs a weighted average on second side voltages of the other M power converters and the second side voltage of the corresponding power converter, to obtain the local common mode signal.

10. The conversion system according to claim 1, wherein the modulating unit is configured to perform carrier phase shift modulation on the control command, to generate the control signal.

11. A control method for controlling a conversion system, wherein the conversion system comprises:
N power converters, each of the power converters comprising a first side and a second side, the first sides of the N power converters being electrically coupled in series, and
N controllers, one-to-one corresponding to the N power converters, and each of the controllers receiving a first side current and a second side voltage of a corresponding power converter;
the control method comprising:
S1, receiving, by each of at least (N−1) controllers of the N controllers, a neighboring direct current voltage signal which only reflects second side voltages of other M power converters; and
S2, generating, by each of at least (N−1) controllers of the N controllers, a control signal for controlling the first side voltage of the corresponding power converter according to the neighboring direct current voltage signal, and the first side current and the second side voltage of the corresponding power converter,
wherein N≥3, 1≤M≤(N−2), and M and N are integers,
wherein the S2 comprises:
S11, calculating a local common mode signal according to the neighboring direct current voltage signal and the second side voltage of the corresponding power converter;
S12, generating a control command according to the local common mode signal, and the first side current and the second side voltage of the corresponding power converter; and
S13, performing modulation on the control command, to generate the control signal,
wherein the S12 comprises:
S121, generating a given signal according to the local common mode signal and a preset voltage reference value;
S122, generating a differential mode command according to the local common mode signal, and the second side voltage and the first side current of the corresponding power converter;
S123, generating a common mode command according to a preset current reference value, the given signal and the first side current of the corresponding power converter; and
S124 performing a calculation on the common mode command and the differential mode command, and generating the control command.

12. The control method according to claim 11, wherein the S121 comprises:
subtracting the local common mode signal from the preset voltage reference value to obtain a fourth intermediate variable;
proportionally controlling the fourth intermediate variable according to a first proportional coefficient to obtain a fifth intermediate variable;
proportionally controlling the fourth intermediate variable according to a second proportional coefficient to obtain an eleventh intermediate variable;
subtracting a local integral signal from a local common mode integral signal to obtain an integral error;
proportionally controlling the integral error according to a third proportional coefficient to obtain a twelfth intermediate variable;
adding the twelfth intermediate variable and the eleventh intermediate variable to obtain a thirteenth intermediate variable;
integrally controlling the thirteenth intermediate variable to obtain the local integral signal; and
adding the fifth intermediate variable, the active current feed-forward value at the first side of the corresponding power converter and the local integral signal to obtain the given signal, wherein the local common mode integral signal is obtained by weighted-averaging local integral signals generated by common mode voltage loops in other M controllers and a local integral signal generated by a common mode voltage loop in a current controller, and the other M controllers are neighbor controllers of the current controller.

13. The control method according to claim 11, wherein the S11 comprises:
performing a weighted average on the second side voltages of the other M power converters and the second side voltage of the corresponding power converter to obtain the local common mode signal.

14. The control method according to claim 11, wherein the S13 comprises:
performing a carrier phase shift modulation on the control command, to generate the control signal.

15. A conversion system, comprising:
N power converters, each of the power converters comprising a first side and a second side, the first sides of the N power converters being electrically coupled in series, and
N controllers, one-to-one corresponding to the N power converters, and each of the controllers receiving a first side current and a second side voltage of a corresponding power converter,
wherein each of at least (N−1) controllers receives a neighboring direct current voltage signal which only reflects second side voltages of other M power converters in the conversion system, and generates a control signal for controlling the first side voltage of the corresponding power converter according to the neighboring direct current voltage signal, and the first side current and the second side voltage of the corresponding power converter, wherein N≥3, 1≤M≤(N−2), and M and N are integers,
wherein an information transmission structure among the N controllers is a balanced diagram,
wherein each of the N controllers comprises:
a calculating unit, configured to calculate a local common mode signal according to the neighboring direct current voltage signal and the second side voltage of the corresponding power converter;
a command generating unit, configured to generate a control command according to the local common mode signal, and the first side current and the second side voltage of the corresponding power converter; and
a modulating unit, configured to perform modulation on the control command, to generate the control signal,
wherein the command generating unit comprises:
a common mode voltage loop, configured to generate a given signal according to the local common mode signal and a preset voltage reference value;
a current loop, configured to generate a common mode command according to a preset current reference value, the given signal and the first side current of the corresponding power converter;
a differential mode voltage loop, configured to generate a differential mode command according to the local common mode signal, and the second side voltage and the first side current of the corresponding power converter; and
a command synthesis unit, configured to perform a calculation on the common mode command and the differential mode command, and generate the control command.

16. The conversion system according to claim 15, wherein the balanced diagram is a unidirectional ring network or a bidirectional ring network.

* * * * *